(12) United States Patent  (10) Patent No.: US 8,297,035 B2
Chikatsune et al.  (45) Date of Patent: Oct. 30, 2012

(54) NORMAL PRESSURE CATIONIC DYEABLE POLYESTER AND FIBER

(75) Inventors: Tetsuya Chikatsune, Matsuyama (JP); Kenji Kawamura, Matsuyama (JP); Kei Tachibana, Matsuyama (JP)

(73) Assignee: Teijin Fibers Limited, Osaka (JP)

( * ) Notice: Subject to any disclaimer, the term of this patent is extended or adjusted under 35 U.S.C. 154(b) by 189 days.

(21) Appl. No.: 12/811,961

(22) PCT Filed: Jan. 7, 2009

(86) PCT No.: PCT/JP2009/050067
§ 371 (c)(1),
(2), (4) Date: Jul. 7, 2010

(87) PCT Pub. No.: WO2009/088008
PCT Pub. Date: Jul. 16, 2009

(65) Prior Publication Data
US 2010/0275568 A1  Nov. 4, 2010

(30) Foreign Application Priority Data

Jan. 8, 2008 (JP) .................................. 2008-001387
Aug. 27, 2008 (JP) .................................. 2008-218081

(51) Int. Cl.
*D02G 3/02* (2006.01)
(52) U.S. Cl. ........................................................ 57/243
(58) Field of Classification Search ............... 57/243, 57/248
See application file for complete search history.

(56) References Cited

U.S. PATENT DOCUMENTS 7,078,096 B2 * 7/2006 Konishi et al. ................. 428/357
7,946,102 B2 * 5/2011 Karayianni et al. ............ 57/225

FOREIGN PATENT DOCUMENTS

| EP | 1 862 488 A1 | 12/2007 |
| JP | 34-10497 B | 11/1956 |
| JP | 62-089725 A | 4/1987 |
| JP | 1-162822 A | 6/1989 |
| JP | 1-172425 A | 7/1989 |
| JP | 5-025708 A | 2/1993 |
| JP | 7-126920 A | 5/1995 |
| JP | 2002-030137 A | 1/2002 |
| JP | 2002-284863 A | 10/2002 |
| JP | 2005-336385 A | 12/2005 |
| JP | 2006-176628 A | 7/2006 |
| JP | 2006-200064 A | 8/2006 |
| WO | WO 2006051380 A1 * | 5/2006 |
| WO | 2006/095627 A1 | 9/2006 |

* cited by examiner

*Primary Examiner* — Shaun R Hurley
(74) *Attorney, Agent, or Firm* — Sughrue Mion, PLLC

(57) ABSTRACT

It is a problem of the present invention to provide a normal pressure cationic dyeable polyester being cationic dyeable under normal pressure, and having high strength. The problem can be solved by a normal pressure cationic dyeable polyester, characterized by being a copolymerized polyester having a main repeating unit including ethylene terephthalate, and including, in an acid component forming the copolymerized polyester, a metal salt of sulfoisophthalic acid (A) and a compound (B) which is a phosphonium salt of sulfoisophthalic acid or the like in such a state as to simultaneously satisfy the two mathematical expressions. Preferably, the glass transition temperature of the copolymerized polyester is within the range of 70 to 85° C., and the intrinsic viscosity of the copolymerized polyester is within the range of 0.55 to 1.00 dL/g. Further, by melt spinning the copolymerized polyester, it is possible to provide a polyester fiber.

10 Claims, 5 Drawing Sheets

FIG. 2
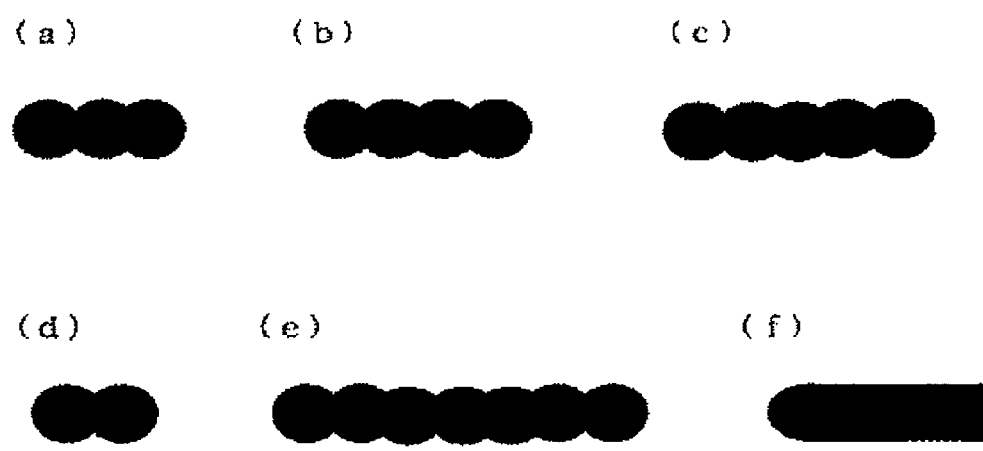
[FIG. 3]
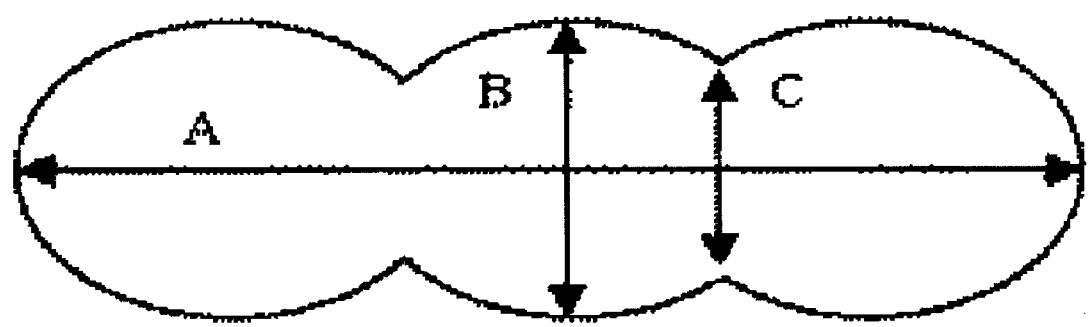

NORMAL PRESSURE CATIONIC DYEABLE POLYESTER AND FIBER

TECHNICAL FIELD

The present invention relates to a normal pressure cationic dyeable polyester which is dyeable with a cationic dye under normal pressure, and a fiber or the like including the same.

BACKGROUND ART

Polyester fibers typified by polyethylene terephthalate can be dyed with only a disperse dye or an azoic dye due to their chemical characteristics. For this reason, polyester fibers have a defect of being less likely to provide a sharp and dark hue. As a method for resolving such a defect, there is proposed a method in which polyester is copolymerized with a metal salt of sulfoisophthalic acid in an amount of 2 to 3 mol % (see, e.g., Patent Document 1 or 2).

However, the polyester fiber obtainable with such a method can be dyed only under high temperatures and high pressures. When the polyester fiber is dyed after interknitting or interweaving with a natural fiber, an urethane fiber, or the like, unfavorably, the natural fiber or the urethane fiber is embrittled. When this is tried to be sufficiently dyed under normal pressure at a temperature of around 100° C., a metal salt of sulfoisophthalic acid becomes required to be copolymerized in a large quantity with polyester. However, in this case, it is difficult to increase the degree of polymerization of polyester due to the thickening effect of the melt viscosity by the action of a sulfonate group. Unfavorably, this results in a remarkable reduction of the strength of the polyester fiber obtained by melt spinning using the polyester, and further results in a remarkable deterioration of the spinning operability. In particular, unfavorably, it is difficult to produce a normal pressure cationic dyeable polyester fiber with a single yarn fineness as fine size as 2 dtex or less.

On the other hand, in order to solve such a problem, there is disclosed a technology of copolymerizing cationic dyeable monomers having a small ion binding intermolecular force (see, e.g., Patent Document 3 or 4). As the cationic dyeable monomers having a small ion binding intermolecular force, there are shown tetrabutylphosphonium 5-sulfoisophthalate, and the like. Polyester resulting from copolymerization of the cationic dyeable monomers is unfavorably inferior in thermal stability. Namely, even when in order to impart normal pressure cationic dyeability thereto, the amount of the compounds thereof to be copolymerized is tried to be increased, thermal decomposition proceeds during the polymerization reaction, which makes it difficult to increase the molecular weight. Further, decomposition by heat history during melt spinning is large, unfavorably resulting in weakening of the resultant yarn. Still further, tetrabutylphosphonium 5-sulfoisophthalate to be used is very expensive, unfavorably resulting in a large increase in cost of the resultant normal pressure cationic dyeable polyester.

As a method for solving such a problem, there is proposed a method, as a method which causes less reduction of the light resistance, and imparts normal pressure dyeability, a method in which a dicarboxylic acid of a straight-chain hydrocarbon such as adipic acid or sebacic acid, or a glycol component such as diethylene glycol, neopentyl glycol, or cyclohexanedimethanol, or polyalkylene glycol with a number-average molecular weight of 400 to 1000 is copolymerized to polyester with a metal salt of sulfoisophthalic acid (see, e.g., Patent Documents 5 to 7).

The methods enable cationic dyeing under normal pressure by reducing the glass transition temperature of polyester by the copolymerizable components, and thereby increasing the diffusion speed of a dye into polyester at a temperature of 100° C. or less. However, with any method, the strength of the normal pressure cationic dyeable polyester fiber obtained by melt spinning the resulting polyester is reduced. Therefore, the tear strength of the fabric obtained using the fiber is reduced, and the glass transition temperature of polyester is reduced. Therefore, the heat setting property is deteriorated, so that false twist crimp processability is inferior, unfavorably resulting in hardened texture, a low dyeing fastness, and other problems. Further, the fiber strength is low, and hence the fine size is difficult to achieve. As a result, unfavorably, it is difficult to obtain a fabric having soft texture.

Whereas, there is proposed a composite fiber including polyester obtained by copolymerizing 5-sodium sulfoisophthalate placed at the sheath part, and polyester including a repeating unit of ethylene terephthalate in an amount of 95 mol % or more placed at the core part (see, e.g., Patent Document 7). However, unfavorably, the amount of copolymerization of the sulfoisophthalic acid metal salt component in copolymerized polyester forming the sheath part has a limitation for the same reason as described above, and hence it is difficult to obtain sufficient dyeability; and formation into a composite fiber results in an increase in processing cost in the spinning step, or results in a restriction on the fiber cross sectional shape; and other problems occur. Further, use of a plurality of kinds of sulfoisophthalic acid components in combination is also disclosed (see, e.g., Patent Document 8). However, within the ranges of the conditions disclosed in the document, the melt viscosity of the resulting polyester is high, so that the strength of the resulting polyester fiber is not sufficient.

Further, when a normal pressure cationic dyeable polyester multifilament and a polyester fiber yarn having a larger hot water shrinkability than this are used to form a differential shrinkage polyester combined filament yarn, the following problems occur. Namely, with a conventional normal pressure cationic dyeable polyester, the hot water shrinkage percentage is high. Thus, the yarn is less likely to become a core-sheath structured yarn in which a normal pressure cationic dyeable polyester yarn uniformly forms the sheath. Further, the fiber strength is low, and hence yarn breakage and fluffing are often caused in the combined filament yarn step, which is a large problem in producing a combined filament yarn with good quality. In view of such circumstances, there has been a demand for a normal pressure cationic dyeable polyester fiber capable of solving the foregoing problems.

Alternatively, also when a normal pressure cationic dyeable polyester is formed into a false twisted textured yarn, the following problems occur. Namely, with a conventional normal pressure cationic dyeable polyester, it is not possible to obtain a yarn satisfying the strength and the elongation capable of standing the false twisting step. Thus, there is a large problem of an increase in occurrence of yarn breakage or fluffing. In view of such circumstances, there has been a demand for a normal pressure cationic dyeable polyester fiber and a normal pressure cationic dyeable polyester false twisted textured yarn each of which has a fine size, and satisfactory strength and elongation, and the like, and thereby is capable of solving the foregoing problems.

[Patent Document 1] JP-B-34-10497
[Patent Document 2] JP-A-62-89725
[Patent Document 3] JP-A-1-162822
[Patent Document 4] JP-A-2006-176628
[Patent Document 5] JP-A-2002-284863
[Patent Document 6] JP-A-2006-200064
[Patent Document 7] JP-A-7-126920
[Patent Document 8] JP-A-1-172425

DISCLOSURE OF THE INVENTION

Problems that the Invention is to Solve

The present invention solves the foregoing problems, and provides a normal pressure cationic dyeable polyester capable of providing a normal pressure cationic dyeable polyester fiber which can undergo cationic dyeing under normal pressure, and has a high strength, also has a favorable heat setting property, and allows easy fixation of crimping or the like. Further, there are provided a normal pressure cationic dyeable polyester fiber including the polyester, and capable of solving the foregoing problems, and a blended yarn and a composite yarn using the fiber.

Means for Solving the Problems

In view of the foregoing problems, the present inventors conducted a close study. As a result, they reached completion of the present invention. Namely, the present invention relates to a copolymerized polyester having a main repeating unit including ethylene terephthalate, the copolymerized polyester including, in an acid component forming the copolymerized polyester, a metal salt of sulfoisophthalic acid (A) and a compound (B) expressed as the following formula (I) in such a state as to simultaneously satisfy the following mathematical expressions (1) and (2). As a result, a normal pressure cationic dyeable polyester satisfying the requirements which are the foregoing problems can be provided:

[formula 1]

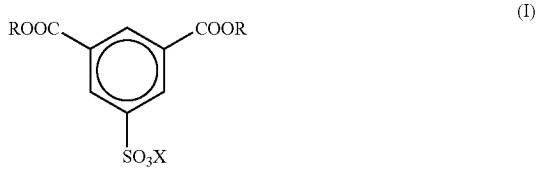

(I)

[wherein in the formula, R represents a hydrogen atom, or an alkyl group having 1 to 10 carbon atoms, X represents a quaternary phosphonium ion or a quaternary ammonium ion;]

$$3.0 \leq A+B \leq 5.0 \quad (1)$$

$$0.3 \leq B/(A+B) \leq 0.7 \quad (2)$$

[where in the mathematical expressions, A represents the copolymerization amount (mol %) of the metal salt of sulfoisophthalic acid (A) based on the total amount of acid components forming the copolymerized polyester, and B represents the copolymerization amount (mol %) of the compound (B) expressed as the formula (I) based on the total amount of acid components forming the copolymerized polyester.] Incidentally, it is also a preferred embodiment of the copolymerized polyester that the glass transition temperature is within the range of 70 to 85° C., and the intrinsic viscosity of the resulting copolymerized polyester is within the range of 0.55 to 1.00 dL/g.

Whereas, the scope of the invention also covers a polyester fiber obtained by melt spinning, and drawing the copolymerized polyester, a polyester fiber obtained from melt spinning, wherein the modification degree of the fiber cross section in the direction orthogonal to the fiber axis of the polyester fiber is 1.2 to 7.0, and also a polyester fiber obtained from melt spinning, wherein the hollow ratio is 2 to 70%. The scope of the invention further covers even a false twisted textured yarn, a composite yarn, a blended yarn, and a covering yarn using the polyester fiber.

Alternatively, the foregoing problems can also be solved by a polyester fiber having a main repeating unit including ethylene terephthalate, characterized in that the breaking strength is 3.0 cN/dtex or more, and a plain woven fabric is produced from the polyester fiber, and the plain woven fabric is dyed under the following normal pressure cationic dyeing conditions, and when the plain woven fabric after dyeing is measured by means of a color difference meter, the L* value is 24 or less. The scope of the invention further covers even a false twisted textured yarn, a composite yarn, a blended yarn, and a covering yarn using the polyester fiber. Normal pressure cationic dyeing conditions black cationic dye: Aizen CATHILON Black BL-DP (manufactured by HODOGAYA Chemical Co., Ltd.) is used in such an amount of 15% of based on the amount of the polyester plain woven fabric, and as a dyeing aid, 3 g/L sodium sulfate, and 0.3 g/L acetic acid are added, and the resulting plain woven fabric is subjected to a dyeing treatment under the conditions of a bath ratio of 1:50 at 98° C. for 1 hour.

Advantage of the Invention

In accordance with the present invention, it is possible to provide normal pressure cationic dyeable polyester, and a normal pressure cationic dyeable polyester fiber which are favorable in dyeability by a dyeing operation using a cationic dye under normal pressure, and has a higher strength than that of a conventional normal pressure cationic dyeable polyester, and is also favorable in heat setting property, which allows easy fixation of crimping or the like. Further, it is possible to provide a combined filament yarn and a covering yarn using the polyester fiber. The combined filament yarn and the covering yarn can be blended with other fibers resistant to other high temperature dyeing, and has high strength low hot water shrinkage. Therefore, they are suitable for gentlemen's and women's clothing use having the balance among sharp tone, texture, fiber strength, and elongation. Further, the normal pressure cationic dyeable polyester multifilament of the invention, or the false twisted textured yarn and the covering yarn using the same are high in strength, and favorable in normal pressure cationic dyeability and dyeing fastness, and hence can be used in the form of a fine size yarn. Therefore, it is possible to obtain a fabric having texture, softness, and denseness. When, as a polyester fiber, a hollow fiber is produced, it is high in strength, and favorable in normal pressure cationic dyeability and dyeing fastness, and has excellent performances in terms of the heat retaining property, bulkiness, lightweight, and the like. Therefore, it is useful for clothing and material applications. Finally, the spun-like composite false twisted textured yarn using the normal pressure cationic dyeable polyester fiber of the invention is favorable in bulkiness, and can be interknitted or interwoven with a natural fiber or an urethane fiber to be dyed. Thus, it is possible to provide a soft and sharp polyester fabric for gentlemen's clothing or polyester fabric for women's clothing.

BRIEF DESCRIPTION OF THE DRAWINGS

FIG. 2 Views each showing a schematic view of the single yarn cross section when the yarn has a specific shape of the polyester flat cross section fibers of the invention.

FIG. 3 A view showing a schematic view of a single yarn cross-sectional view of the polyester flat cross section fiber of the invention.

Figure 1:
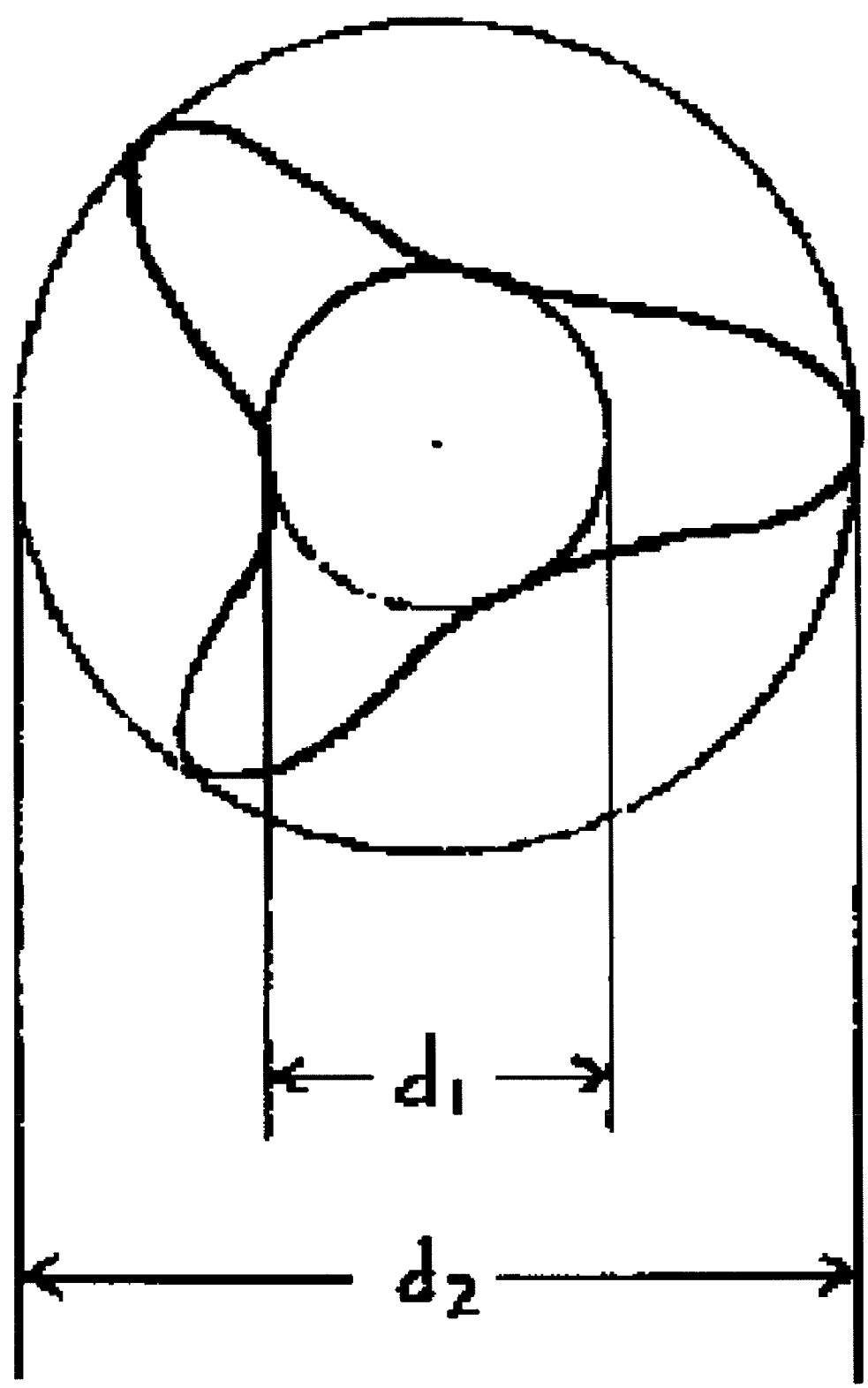
FIG. 1 A view for showing the modification degree of the cross section in a modified cross section polyester fiber of the present invention.

REFERENCE NUMERALS AND SIGNS OF DRAWINGS d1: Diameter of a circle inscribed on the fiber cross sectional shape in the direction orthogonal to the fiber axis of a filament
d2: Diameter of a circle circumscribed on the fiber cross sectional shape in the direction orthogonal to the fiber axis of a filament
(a), (b), (c): Cross-sectional view in the preferable case of the single yarn forming the polyester flat cross section fiber of the invention
(d): Cross-sectional view of a flat yarn having two mountains which is similarly an undesirable case
(e): Cross-sectional view of a flat yarn having seven mountains which is similarly an undesirable case
(f): Cross-sectional view of a flat cross section yarn which is similarly an undesirable case
A: Major axis of flat cross section fiber
B: Maximum diameter of minor axis of flat cross section fiber
C: Minimum diameter of minor axis of flat cross section fiber
A1: Raw yarn including normal pressure cationic dyeable polyester filament
B1: Raw yarn imparted with features other than A1
1: Feed roller
2: Preheating roller
3: Air jet nozzle for intermingling
4: Take-up roller
5: Set heater
6: Winding package (normal pressure cationic dyeable combined filament yarn of the invention)
7: Normal pressure cationic dyeable polyester yarn of the invention
8: Yarn guide
9, 9': Feed roller
10: Interlace nozzle
11: First heater
12: Cooling plate
13: False twist disk unit
14: First delivery roller
15: Second heater
16: Second delivery roller
17: Winding roller
18: Polyester false twisted textured yarn cheese
19, 19': Raw yarn
20: Guide
21: Tension device
22: Feed roller
23: Interlace nozzle
24: First delivery roller
25: Heater
26: False twisting tool
27: Second delivery roller
28: Winding roller
29: Winding cheese

BEST MODE FOR CARRYING OUT THE INVENTION

Below, the present invention will be described in details.

The copolymerized polyester for use in the invention is a copolymerized polyester containing, as a main repeating unit, ethylene terephthalate obtained from polycondensation reaction of terephthalic acid or an ester formable derivative thereof and an ethylene glycol component. It is a copolymerized polyester containing, as the copolymerizable components, a metal salt of sulfoisophthalic acid (A) and a compound (B) expressed as the following formula (I) in such a state as to simultaneously satisfy the following mathematical expressions (1) and (2). It is a more preferred copolymerized polyester wherein the glass transition temperature is within the range of 70 to 85° C., and the intrinsic viscosity of the resulting copolymerized polyester is within the range of 0.55 to 1.00 dL/g.

[formula 2]

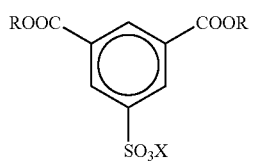

(I)

[wherein in the formula, R represents a hydrogen atom, or an alkyl group having 1 to 10 carbon atoms, X represents a quaternary phosphonium ion or a quaternary ammonium ion;]

$$3.0 \leq A+B \leq 5.0 \quad (1)$$

$$0.3 \leq B/(A+B) \leq 0.7 \quad (2)$$

[where in the mathematical expressions, A represents the copolymerization amount (mol %) of the metal salt of sulfoisophthalic acid (A) based on the total amount of acid components forming the copolymerized polyester, and B represents the copolymerization amount (mol %) of the compound (B) expressed as the formula (I) based on the total amount of acid components forming the copolymerized polyester.]

Herein, as the ester formable derivative of terephthalic acid, mention may be made of dimethyl ester, diethyl ester, dipropyl ester, dibutyl ester, dihexyl ester, dioctyl ester, didecyl ester, or diphenyl ester of terephthalic acid, or terephthalic acid dichloride, or terephthalic acid dibromide. However, out of these, terephthalic acid dimethyl ester is preferred.

(Copolymerized Polyester)

The copolymerized polyester in the invention is polyester containing ethylene terephthalate as a main repeating unit. Herein, the main repeating unit represents an ethylene terephthalate unit accounting for 80 mol % or more based on the total amount of the repeating units forming the copolymerized polyester. Preferably, ethylene terephthalate units account for 90 mol % or more. Other components may also be copolymerized in an amount within the range of 20 mol % or less based on the total amount of the repeating units forming the copolymerized polyester. As other copolymerizable components, mention may be made of, as dicarboxylic acid components, isophthalic acid, 2,6-naphthalenedicarboxylic acid, 2,7-naphthalenedicarboxylic acid, 4,4'-diphenyl dicarboxylic acid, 4,4'-diphenylmethane dicarboxylic acid, diphenyl ketone dicarboxylic acid, 4,4'-diphenylsulfone dicarboxylic acid, succinic acid, adipic acid, and azelaic acid. Further, as other copolymerizable components, mention may be made of, as glycol components, 1,2-propylene glycol, trimethylene glycol, tetramethylene glycol, heptamethylene glycol, hexamethylene glycol, diethylene glycol, dipropylene glycol, bis(trimethylene glycol), bis(tetramethylene glycol), triethylene glycol, 1,4-dihydroxy cyclohexane, and 1,4-cyclohexanedimethanol. A component resulting from reaction of one or more kinds of the dicarboxylic acid components and one or more kinds of the glycol components may be copolymerized in a ratio of 20 mol % or less based on the total amount of the repeating units.

(Metal Salt of Sulfoisophthalic Acid (A))

As the metal salt of sulfoisophthalic acid (A) for use in the invention, there can be exemplified an alkali metal salt (lithium salt, sodium salt, potassium salt, rubidium salt, or cesium salt) of 5-sulfoisophthalic acid. If required, an alkaline-earth metal salt such as a magnesium salt or calcium salt of 5-sulfoisophthalic acid may also be used in combination. Further, ester formable derivatives thereof are also preferably exemplified. As ester formable derivatives, mention may be made of dimethyl ester, diethyl ester, dipropyl ester, dibutyl ester, dihexyl ester, dioctyl ester, didecyl ester, and diphenyl ester of 5-sulfoisophthalic acid metal salt, or an acid halide of 5-sulfoisophthalic acid metal salt. Out of these, dimethyl ester of a 5-sulfoisophthalic acid metal salt is preferred. Out of the compound group, from the viewpoints of the thermal stability, cost, and the like, an alkali metal salt of 5-sulfoisophthalic acid is preferably exemplified. Particularly, 5-sodium sulfoisophthalate or sodium dimethyl 5-sulfoisophthalate which is a dimethyl ester thereof is preferably exemplified. In the case of the compound satisfying these conditions, the compatibility between the sufficient normal pressure cationic dyeability and the sufficient fiber strength is possible when the compound is formed into a polyester fiber.

(Compound (B))

Whereas, as the compound (B) expressed as the formula (I), mention may be made of a quaternary phosphonium salt of 5-sulfoisophthalic acid or a lower alkyl ester thereof, or a quaternary ammonium salt of 5-sulfoisophthalic acid or a lower alkyl ester thereof. As a quaternary phosphonium salt and a quaternary ammonium salt, a quaternary phosphonium salt and a quaternary ammonium salt, respectively, in which an alkyl group, a benzyl group, or a phenyl group is attached to a phosphorus atom or a nitrogen atom are preferred. Particularly preferred is a quaternary phosphonium salt. Further, four substituents attached to a phosphorus atom or a nitrogen atom may be the same or different. Specific examples of the compound expressed by the formula (I) may include 5-sulfoisophthalic acid tetramethyl phosphonium salt, 5-sulfoisophthalic acid tetraethyl phosphonium salt, 5-sulfoisophthalic acid tetrabutyl phosphonium salt, 5-sulfoisophthalic acid ethyl tributyl phosphonium salt, 5-sulfoisophthalic acid benzyl tributyl phosphonium salt, 5-sulfoisophthalic acid phenyl tributyl phosphonium salt, 5-sulfoisophthalic acid tetraphenyl phosphonium salt, 5-sulfoisophthalic acid butyl triphenyl phosphonium salt, 5-sulfoisophthalic acid benzyl triphenyl phosphonium salt, 5-sulfoisophthalic acid tetramethyl ammonium salt, 5-sulfoisophthalic acid tetraethyl ammonium salt, 5-sulfoisophthalic acid tetrabutyl ammonium salt, 5-sulfoisophthalic acid tetraphenyl ammonium salt, 5-sulfoisophthalic acid phenyl tributyl ammonium salt, 5-sulfoisophthalic acid benzyl trimethyl ammonium salt, or 5-sulfoisophthalic acid benzyl tributyl ammonium salt. Alternatively, there are preferably exemplified dimethyl ester, diethyl ester, dipropyl ester, dibutyl ester, dihexyl ester, dioctyl ester, or didecyl ester of a phosphonium salt or an ammonium salt of the isophthalic acid derivatives. Out of the isophthalic acid derivatives, there are more preferably exemplified 5-sulfoisophthalic acid dimethyl tetrabutyl phosphonium salt, 5-sulfoisophthalic acid dimethyl benzyl tributyl phosphonium salt, 5-sulfoisophthalic acid dimethyl tetraphenyl phosphonium salt, 5-sulfoisophthalic acid dimethyl tetramethyl ammonium salt, 5-sulfoisophthalic acid dimethyl tetraethyl ammonium salt, 5-sulfoisophthalic acid dimethyl tetrabutyl ammonium salt, and 5-sulfoisophthalic acid dimethyl benzyl trimethyl ammonium salt. In the case of the compound satisfying these conditions, the compatibility between the sufficient normal pressure cationic dyeability and the sufficient fiber strength is possible when the compound is formed into a polyester fiber.

(Mathematical Expression (1))

In the invention, the total copolymerization amount of the metal salt of sulfoisophthalic acid (A) and the compound (B) to be copolymerized to polyester is required to be within the range of 3.0 to 5.0 mol % in terms of the sum A+B of the (A) component and the (B) component based on the total amount of acid components forming the copolymerized polyester. When the amount is less than 3.0 mol %, it is not possible to obtain sufficient dyeing under the cationic dyeing conditions under normal pressure. On the other hand, when the amount is more than 5.0 mol %, the resulting polyester yarn is reduced in strength, and hence is not suitable for practical use. Further, dye is excessively consumed, which is also disadvantageous in terms of cost. The amount is preferably 3.2 to 4.8 mol %, and more preferably 3.3 to 4.7 mol %.

(Mathematical Expression (2))

Whereas, the component ratio of the metal salt of sulfoisophthalic acid (A) and the compound (B) is required to be within the range of 0.3 to 0.7 in terms of B/(A+B) based on the value in mol %. In such a state that the component ratio is less than 0.3, namely, the ratio of the component (A) is larger, it becomes difficult to increase the degree of polymerization of the resultant copolymerized polyester due to the thickening effect by the sulfoisophthalic acid metal salt. On the other hand, in such a state that the component ratio exceeds 0.7, namely, the ratio of the compound (B) is larger, the polycondensation reaction rate is slowed. When the ratio of the compound (B) is further larger, it becomes difficult to increase the degree of polymerization due to proceeding of the thermal decomposition reaction. When the ratio of the compound (B) is still further increased, the thermal stability of the copolymerized polyester is deteriorated. This results in an increase of reduction of the molecular weight due to the thermal decomposition reaction upon remelting at the melt spinning stage. Therefore, the strength of the resultant polyester yarn is undesirably reduced. Preferably, the component ratio is 0.32 to 0.65, and more preferably 0.35 to 0.60.

By copolymerizing the metal salt of sulfoisophthalic acid (A) to polyester, it is possible to impart the normal pressure cationic dyeability. However, it has been conventionally difficult to achieve a high degree of polymerization of the copolymerized polyester due to the thickening effect of the melt viscosity of the copolymerized polyester considered to be derived from the ionic bond between the sulfonic acid metal salt groups. For this reason, it is not possible to obtain a copolymerized polyester having a sufficiently high degree of polymerization, and a high intrinsic viscosity. The polyester fiber obtainable from the copolymerized polyester not having a high intrinsic viscosity is unfavorably remarkably reduced in fiber strength. On the other hand, in order to solve the problem, it is disclosed that a tetraalkyl ammonium salt of sulfoisophthalic acid or a tetraalkyl phosphonium salt of sulfoisophthalic acid, namely, the compound (B) is copolymerized to polyester. However, the compound tends to undergo thermal decomposition during the polycondensation reaction. Therefore, when the amount of copolymerization is tried to be increased, the thermal decomposition reaction unfavorably tends to proceed. Thus, it has been still difficult to achieve a high value of the polyester fiber strength. We found out the following. In the copolymerized polyester of the invention, the metal salt of sulfoisophthalic acid (A) and the compound (B) are used in combination, and the amounts of copolymerization and the copolymerization ratio of both the compounds are set within specific ranges. As a result, the resulting copolymerized polyester simultaneously has such physical properties that the compatibility between the sufficient dyeability by a normal pressure cationic dye and the high fiber strength is achieved, and that the heat setting property is favorable, which allows easy fixation of crimping. As a result, we reached the invention. Surprisingly, the fiber using the copolymerized polyester has dyeability by a cationic dye, a high fiber strength, and even a physical property of a favorable heat setting property, which allows easy fixation of crimping. Further, the glass transition temperature and the intrinsic viscosity of the copolymerized polyester are set within specific ranges. This enables the compatibility between sufficient dyeability by a normal pressure cationic dye and the high fiber strength.

(Glass Transition Temperature)

As for the copolymerized polyester of the invention, it is also preferable that the glass transition temperature (Tg) with the measuring method (programming rate=20° C./min) according to the DSC (differential scanning calorimetry) method is within the range of 70 to 85°. When Tg is less than 70° C., the heat setting property of the polyester fiber obtained by melt spinning is deteriorated, resulting in deterioration of the false twist crimp processability. This may result in an untwistable state. Therefore, the texture of the fabric obtained from the polyester fiber formed of the copolymerized polyester may be deteriorated. The reduction of the glass transition temperature can be accomplished by copolymerizing adipic acid, sebacic acid, diethylene glycol, polyethylene glycol, or the like thereto. However, in the invention, the copolymerizable components may be copolymerized in a trace amount so long as the amount is within the range satisfying the condition of the glass transition temperature. The range of the preferred value of Tg is 71 to 80° C.

On the other hand, it is generally known that the glass transition temperature of polyethylene terephthalate is about 70 to 80° C. Therefore, in the copolymerized polyester of the invention, as described above, other copolymerizable components may be copolymerized. However, for the component which remarkably reduces the glass transition temperature as a result of copolymerization thereof, copolymerization thereof is undesirable. Examples of a method for setting the glass transition temperature within the range of the values may include a method wherein the compounds which may be copolymerized mentioned in the paragraph of description of the copolymerized polyester is appropriately adjusted in kind and copolymerization ratio, to be copolymerized.

(Intrinsic Viscosity)

The intrinsic viscosity of the copolymerized polyester of the invention (measuring solvent: orthochlorophenol, measuring temperature: 35° C.) is preferably within the range of 0.55 to 1.00 dL/g. When the intrinsic viscosity is less than 0.55 dL/g, the strength of the resulting polyester fiber may be insufficient. On the other hand, when the intrinsic viscosity exceeds 1.00 dL/g, the melt viscosity of the copolymerized polyester is too high, which may unfavorably make melt molding difficult. Whereas, when the intrinsic viscosity exceeds 1.00 dL/g, the intrinsic viscosity of the copolymerized polyester is generally increased with a solid phase polymerization process following a melt polymerization process, and hence, the production cost in the polycondensation step is unfavorably largely increased. The intrinsic viscosity of the normal pressure cationic dyeable polyester is further preferably within the range of 0.60 to 0.90 dL/g. The intrinsic viscosity of the copolymerized polyester can be set within the range of 0.55 to 1.00 dL/g in the following manner. The final polymerization temperature and polymerization time for carrying out melt polymerization are adjusted. Alternatively, when the adjustment is difficult with only the melt polymerization process, the adjustment can be appropriately achieved by carrying out solid phase polymerization. In the invention, the metal salt of sulfoisophthalic acid (A) and the compound (B) are copolymerized to polyethylene terephthalate so as to satisfy the mathematical expressions (1) and (2). Thus, in the foregoing manner, the intrinsic viscosity can be set at 0.55 to 1.00 dL/g.

(DEG Content)

The content of diethylene glycol contained in normal pressure cationic dyeable polyester in the invention is preferably 2.5 wt % or less. It is more preferably 2.2 wt % or less, and furthermore preferably 1.85 to 2.2 wt %. Generally, when normal pressure cationic dyeable polyester is produced, in order to control the amount of diethylene glycol (DEG) by-produced in the production step of polyester, as a DEG inhibitor, a small amount of at least one of alkali metal salt, alkaline-earth metal salt, tetraalkyl phosphonium hydroxide, tetraalkyl ammonium hydroxide, trialkylamine, and the like is preferably added in an amount of about 1 to 20 mol % based on the amount of cationic dyeable monomers used (in the case of the invention, the total mol amount of the metal salt of sulfoisophthalic acid (A) and the compound (B)).

(Kind of Inactive Particles)

Further, the copolymerized polyester of the invention can also be allowed to contain specific inactive particles to form a normal pressure cationic dyeable polyester composition. More specifically, the foregoing copolymerized polyester is allowed to contain inactive particles, which have an average particle diameter within the range of 0.01 to 0.5 μm and in which the frequency distribution ratio of particles with a particle diameter of more than 0.5 μm is 20 wt % or less based on the total weight of the inactive particles, in an amount of 0.1 to 5.0 wt % based on the weight of the normal pressure cationic dyeable polyester composition, resulting in a normal pressure cationic dyeable polyester composition. By formation into the polyester composition, when a polyester fiber is produced from a polyester composition thereof, the compatibility between the sufficient dyeability by a cationic dye and the high fiber strength can be achieved. In addition, the physical properties such as sharpness and dark color stainability upon dyeing the polyester fiber thereof can also be simultaneously improved. The inactive particles will be described in details below.

Further, the inactive particles are at least one kind of inactive particles selected from a group consisting of calcium carbonate, calcium phosphate, calcium silicate, silicon oxide, aluminum oxide, silicone powder, kaolinite, silica sol, barium sulfate, and titanium oxide. Further, the inactive particles may be used in single kind or in combination of a plurality of kinds thereof. Further, out of these, particularly, calcium carbonate, calcium phosphate, and silica sol are preferably used. Still further, as calcium phosphate, tribasic calcium phosphate not having an active hydrogen atom is in particular preferably used.

The normal pressure cationic dyeable polyester composition preferably contains the normal pressure cationic dyeable polyester, and further, inactive particles, which have an average particle diameter within the range of 0.01 to 0.5 μm and in which the frequency distribution ratio of particles with a particle diameter of more than 0.5 μm is 20 wt % or less, in an amount of 0.1 to 5.0 wt % based on the total weight of the normal pressure cationic dyeable polyester composition. The term "inactive" herein means not effecting a chemical reaction with a group forming the copolymerized polyester chain in a step of a production process of the copolymerized polyester, and a step of manufacturing or treating a fiber, or other molded products described later.

(Particle Diameter of Inactive Particles)

The inactive particles in the invention preferably has an average particle diameter within the range of 0.01 to 0.5 μm. When the average particle diameter of the inactive particles exceeds 0.5 μm, the inactive particles tend to precipitate during the manufacturing step of a sol, a copolymerized polyester reaction stock solution, or the like. Thus, the inactive particles cannot be supplied/dispersed with stability. On the other hand, when the average particle diameter of the inactive particles is less than 0.01 μm, the specific surface area of the particle is too large. Thus, agglomerate particles may be formed with ease during the reaction in the copolymerized polyester production step. As a result, when the resulting normal pressure cationic dyeable polyester composition is made into yarn by melt spinning, frequency of occurrence of yarn breakage unfavorably increases. The average particle diameter of the inactive particles is preferably within the range of 0.02 to 0.4 μm, and further preferably within the range of 0.03 to 0.3 μm.

In the inactive particles in the invention, the frequency distribution ratio of particles having a particle diameter of more than 0.5 μm is preferably 20 wt % or less. When the frequency distribution ratio of particles having a particle size of more than 0.5 μm exceeds 20 wt %, even when the resulting normal pressure cationic dyeable polyester composition is made into yarn, and then is subjected to alkali peeling, fine pores formed in the fiber surface increase in size. Thus, unfavorably, the dark color effect upon dyeing cannot be obtained. The frequency distribution ratio of particles (coarse particles) having a particle diameter of more than 0.5 μm in the inactive particles is preferably within the range of 15 wt % or less, and further preferably within the range of 10 wt % or less. From these viewpoints, for producing the normal pressure cationic dyeable polyester composition, it is important to sufficiently pay attention to the kind and the particle diameter of the inactive particle, and to select proper inactive particles.

(Content of Inactive Particles)

The inactive particle content in the invention is preferably within the range of 0.1 to 5.0 wt % based on the total weight of the normal pressure cationic dyeable polyester composition. When the inactive particle content is less than 0.1 wt %, the dark color stainability of the finally resulting polyester fiber is insufficient. Whereas, when the inactive particle content exceeds 5.0 wt %, the strength, heat resistance, and light resistance of the resulting polyester fiber are unfavorably reduced. The particle content is preferably within the range of 0.15 to 3.0 wt %, and further preferably within the range of 0.2 to 1.0 wt %.

(Production Method of Copolymerized Polyester)

Production of the copolymerized polyester in the invention has no particular restriction. A generally known polyester production method is used, except for paying attention to use of the metal salt of sulfoisophthalic acid (A) (which may be hereinafter abbreviated as a compound A) and the compound (B) so as to satisfy the conditions according to claim 1. Namely, first, terephthalic acid and ethylene glycol are allowed to directly undergo esterification reaction to produce a low polymer. Alternatively, an ester formable derivative of terephthalic acid typified by dimethyl terephthalate and ethylene glycol are allowed to undergo an ester exchange reaction to produce a low polymer. Then, the low polymer which is a reaction product is heated under reduced pressure in the presence of a polycondensation catalyst, and is allowed to undergo a polycondensation reaction until a prescribed degree of polymerization is achieved. As a result, production thereof can be achieved. Also for a method for copolymerizing a sulfoisophthalic acid-containing aromatic dicarboxylic acid and/or an ester derivative thereof (the metal salt of sulfoisophthalic acid (A) and the compound (B)), there can be used a generally known production method. Addition of the compounds to the reaction step can be carried out at a given timing from the beginning of the start of the ester exchange reaction or the esterification reaction to the start of the polycondensation reaction. As for the compound (B) which tends to undergo thermal decomposition, there can be preferably selected addition at a timing from the completion of the esterification reaction or the ester exchange reaction to the start of the polycondensation reaction.

Whereas, also for the catalyst during the ester exchange reaction, there can be used the catalyst compound to be used for effecting a general ester exchange reaction. Also for a polycondensation catalyst, there can be used a commonly used antimony compound, germanium compound, or titanium compound. Alternatively, there can be used a reaction product of a titanium compound and aromatic polyvalent carboxylic acid or an anhydride of aromatic polyvalent carboxylic acid, or a reaction product of a titanium compound and a phosphorus compound.

Whereas, when the inactive particles are added, they are added in a given step of the steps of the production method of the copolymerized polyester, which enables production of a normal pressure cationic dyeable polyester composition. Specifically, the inactive particles can be added/molten and kneaded in a molten state at a stage of from the start to the end of the esterification reaction or the ester exchange reaction step, a stage of from the start to end of the polycondensation reaction step, or a stage of having remolten the copolymerized polyester after once completion of the polycondensation reaction.

(Other Additives)

Further, the copolymerized polyester in the invention may contain, if required, a small amount of additive such as antioxidant, fluorescent brightening agent, antistatic agent, antimicrobial agent, ultraviolet absorber, light stabilizer, thermal stabilizer, light shielding agent, matting agent, or the like. Particularly, an antioxidant, a matting agent, and the like are in particular preferably added.

(Melt Spinning Method, Yarn Making Method)

The yarn making method of the copolymerized polyester in the invention has no particular restriction, and a conventionally known method is adopted. Namely, it is preferable that the dried copolymerized polyester is subjected to melt spinning at a temperature in the range of 270° C. to 300° C. for production. The spinning rate for carrying out melt spinning is preferably 400 to 5000 m/min. When the spinning rate is within this range, the strength of the resulting polyester fiber is also sufficient, and winding can also be carried out with stability. Further, the undrawn yarn or partially drawn yarn obtained with the foregoing method is preferably drawn within the range of about 1.2 times to 6.0 times in a drawing step. The drawing step may be carried out after once winding the undrawn polyester fiber, or may be carried out continuously without once winding the fiber. Further, the shape of the spinneret for use in spinning also has no particular restriction, and may be any of circle, polygon such as triangle/rectangle, 3 or more multi-foil, C-shaped cross section, H-shaped cross section, X-shaped cross section, and hollow cross section. The modified cross section polyester fiber and hollow polyester fiber obtained by using such a spinneret will be described later. Even in the case of the copolymerized polyester composition containing inactive particles, melt spinning can be carried out in the same manner.

(Multifilament Including Copolymerized Polyester)

By melt spinning, and then drawing using the copolymerized polyester in the invention, it is possible to obtain a polyester fiber (multifilament) having a main repeating unit including ethylene terephthalate, the polyester fiber including, in an acid component forming the polyester, a metal salt of sulfoisophthalic acid (A) and a compound (B) expressed as the foregoing general formula (I) in such a state as to simultaneously satisfy the foregoing mathematical expressions (1) and (2). Further, the polyester fiber is also preferably a normal pressure cationic dyeable polyester fiber (multifilament) which has a single yarn fineness of 7 dtex or less, in which the number of bound single yarns is 24 or more, and which has a strength of 2.0 cN/dtex or more, and an elongation of 60% or less.

When finally, the use purpose of the polyester fiber is mainly the clothing use, for carrying out spinning with the foregoing yarn making method, the relation between the discharge amount and the winding rate such that the winding fineness after drawing is 84 dtex or less is preferable. Further, the number of holes of the spinneret for extruding a polymer is preferably 24 or more. Further, the undrawn yarn or partially drawn yarn obtained with the foregoing method is preferably drawn within the range of about 1.2 times to 6.0 times in a drawing step. The drawing may be carried out after once winding the undrawn polyester fiber, or may be carried out continuously without once winding the fiber. Further, the shape of the spinneret for use in spinning has no particular restriction.

Preferably, adjustment is achieved within the range of the yarn making method, thereby to implement the drawn polyester fiber of the invention which has a single yarn fineness of 7 dtex or less, in which the number of bound single yarns is 24 or more, and a strength of 3.0 cN/dtex or more, an elongation of 60% or less, and a hot water shrinkage percentage of 22% or less. Herein, hot water denotes 98° C., or 98° C. to 100° C. water. More preferably, the strength is 3.5 cN/dtex or more. Herein, preferably, the single yarn fineness is 7 dtex or less, and the number of bound single yarns is 24 or more. When the single yarn fineness exceeds 7 dtex, the texture unfavorably becomes hardened. When the number of single yarns is less than 24, the volume feeling is unfavorably reduced.

The strength of the resulting polyester fiber is preferably 3.0 cN/dtex or more. When the polyester fiber has a strength of less than 3.0 cN/dtex, the tear strength in the fiber form is unfavorably reduced. More preferably the strength of the polyester fiber is 3.5 cN/dtex or more. Whereas, the elongation of the polyester fiber is preferably 60% or less, and more preferably 10 to 40%. When the elongation exceeds 60%, the shrinkage unevenness of the yarn may be unfavorably increased. Further, when the elongation is less than 10%, the weavability is inferior, so that a woven fabric may be difficult to form.

Further, the hot water shrinkage percentage of the normal pressure cationic dyeable polyester multifilament of the invention is preferably set at 22% or less. More preferably, the hot water shrinkage percentage of the polyester multifilament is 5 to 18%. When the hot water shrinkage percentage exceeds 22%, shrinkage of the fiber is large upon dyeing. Whereas, when the multifilament is used as a low shrinkage yarn of a differential shrinkage combined filament yarn, and is used for the sheath part of the core-sheath structured combined filament yarn, it unfavorably has too large restriction.

Alternatively, by using the copolymerized polyester of the invention as one component, it is also possible to produce a composite polyester fiber. As the form of the composite fiber, any of the side by side type, the core sheath type, and the sea island type can be adopted, and there is no particular restriction thereon. The polyester fiber using the copolymerized polyester of the invention can be increased in fiber strength as compared with a conventional cationic dyeable polyester fiber as described above. This enables production of a sea island type composite fiber using the copolymerized polyester of the invention for the island component. As a result, it becomes possible to obtain an ultrafine polyester fiber as compared with a conventional cationic dyeable polyester fiber.

(Alkali Peeling Processing)

The polyester fiber of the invention can be subjected to peeling processing in an aqueous solution containing an alkali compound as with a conventional polyester fiber. Especially when the copolymerized polyester composition is formed into a polyester fiber, in order for the fiber to exhibit a structure having fine pores in the fiber, the following procedure can also be carried out. The fiber is subjected to an alkali peeling treatment, and then, the fiber is dyed by a cationic dye under normal pressure. For the alkali peeling treatment and the normal pressure cationic dyeing treatment, a known method can be adopted. However, the polyester fiber obtained by the foregoing method is used, and is made into a state of woven and knitted fabric. Then, the fiber is subjected to an alkali peeling treatment, resulting in a structure having fiber fine pores. As a result, by the light scattering effect on the polyester fiber surface, and permeation of the cationic dye into the inside of the fiber, dyeing to the inside of the fiber cross section becomes possible. This enables an improvement of the dark color property which is one of the problems of the invention.

(Regarding Modified Cross Section Fiber)

The polyester fiber of the invention also includes a modified cross section polyester fiber formed of the copolymerized polyester. Only the modified cross section can provide a fiber excellent in hue. However, the cross sectional shape of the polyester fiber in the invention preferably has a modification degree satisfying the numerical value range of 1.2 to 7.0. By achieving the fiber cross section with such a high modification degree, it is possible to implement a polyester fiber having further excellent gloss.

In the invention, the modification degree in the transverse cross sectional shape in the direction orthogonal to the fiber axis of the filament forming the polyester multifilament is, as shown in FIG. 1, defined as the ratio of the diameter of the circumcircle to the diameter of the inscribed circle, i.e., $d2/d1$, where $d2$ denotes the diameter of a circle circumscribed on the transverse cross sectional shape in the direction orthogonal to the fiber axis of the filament, and $d1$ denotes the diameter of a circle inscribed thereon. This indicates as follows. As the value approaches 1.0, the transverse cross sectional shape approaches a circle. Whereas, as the value increases, the cross sectional shape of the fiber becomes a sharper shape. In the modified cross section polyester fiber of the invention, the value is preferably set at 1.2 to 7.0.

However, the modification degree when the fiber has a circular hollow part in the transverse cross section of the fiber is defined as the ratio of the diameter of the circumcircle to the difference between the diameter of the inscribed circle and the diameter of the hollow part, i.e., $d2/(d1-d3)$ where $d3$ denotes the diameter of the hollow part. Whereas, when the hollow part in the transverse cross section of the fiber is not in the shape of a circle, or when two or more hollow parts are included, it is essential only that $d3$ denotes the diameter of the hollow part when a circular hollow part having the same area as the total area of the hollow parts is assumed to be in the center of the transverse cross section. In the case of a concentric yarn (the transverse cross sectional shape is a circle, and the hollow part is also in the shape of a circle), it is essential only that $d1=d2=R$ (diameter of the transverse cross sectional shape of the yarn).

When the modification degree is less than 1.2, the gloss of the fiber may be insufficient. Then, it is essential only that the modification degree of the filament forming the multifilament may be 1.2 or more, and preferably 2.0 or more and 5.0 or less.

Further, such a fiber of the invention is generally referred to as a modified cross section fiber. Non-limiting examples of the shape thereof may include multifoil shape, flat shape, Y shape, C shape, V shape, W shape, and I shape. However, in view of the balance between the physical properties and the gloss, the shape is most preferably a Y shape. Further, as described later, a flat cross section polyester fiber in which the cross sectional shape of the single yarn is a flat shape, and the flat shape has a shape such that 3 to 6 round cross section single yarns are bonded together in the longitudinal direction can also be preferably adopted for a specific purpose.

Then, as a production method of a fiber of which the fiber cross section is modified as in the invention, a production method by discharging a polymer directly from a spinneret having a modified shape orifice is most simple. Specifically, the following method can also be employed. The fiber is produced by so-called composite spinning, in which polymers of a plurality of components having different dissolution rates are discharged from the same orifice or different orifices, and are bonded. Then, easy-to-dissolve components are subjected to a dissolution treatment in the post step for modification. Other than this, by appropriately applying the foregoing yarn making method, it is possible to obtain a modified cross section polyester fiber.

The modified cross section polyester fiber obtained in this manner is a fiber excellent in gloss with transparent feeling while having a favorable hue, and less fibrillating, and excellent in quality. Then, the modified cross section polyester fiber of the invention is preferably used for various fiber applications such as for fiber for clothing, fiber for interior/bedding typified by curtain, carpet, wadding, or the like, various woven fabrics, various knitted fabrics, staple nonwoven fabrics, and filament nonwoven fabrics.

(Hollow Ratio (%) and Variations in Hollow Ratio)

The polyester fiber of the invention also includes a hollow polyester fiber formed of the foregoing copolymerized polyester. Thus, when the polyester fiber of the invention is a hollow fiber, the hollow ratio can be calculated in the following manner. The cross sectional photograph (600 times in magnification) of the spun and wound polyester multifilament was taken. The hollow part area (A) of the cross section orthogonal to the fiber axis of each single yarn except for the cross section in which hollow breakage is observed, and the area (B) enclosing the cross section are measured, and calculated by the following equation. Thus, the average value of all the measured values is referred to as the hollow ratio (%).

Hollow ratio (%)=$A/B \times 100$

Whereas, the degree of fluctuation of the measured values [(standard deviation/average value)$_x$ 100] is referred to as variations in hollow ratio. When the polyester fiber of the invention is a hollow fiber, the hollow ratio thus calculated is preferably 2 to 70%.

(Hollow Breakage Occurrence Rate (%))

In the cross sectional photograph obtained above, the number of cross sections of the single yarns including hollow breakage is counted, and the proportion (%) accounting for the total number of the cross sections of the single yarns is referred to as the hollow breakage occurrence rate. Incidentally, the hollow polyester fiber can be obtained by the foregoing method, except for using a spinneret for a hollow fiber as the spinneret. Incidentally, when the fiber is used as the hollow fiber, the single yarn fineness is preferably 0.3 to 6.0 dtex. It is more preferably 1.0 to 5.0 dtex.

(Flat Cross Section Fiber)

The polyester fibers of the invention also include a flat cross section polyester fiber having a specific shape formed of the copolymerized polyester. Below, a detailed description will be given to the polyester flat cross section fiber in which the cross sectional shape of the single yarn is a flat shape, and the flat shape has a specific shape. The polyester flat cross section fiber is a flat cross section fiber in which the cross sectional shape of the single yarn is a flat shape, and the flat shape has a shape such that 3 to 6 round cross section single yarns are bonded together in the longitudinal direction. Herein, the wording "such that 3 to 6 round cross section single yarns are bonded together" means not being actually bonded at the melt spinning stage, but resultingly having a shape "such that 3 to 6 round cross section single yarns are bonded together".

Figure 4:
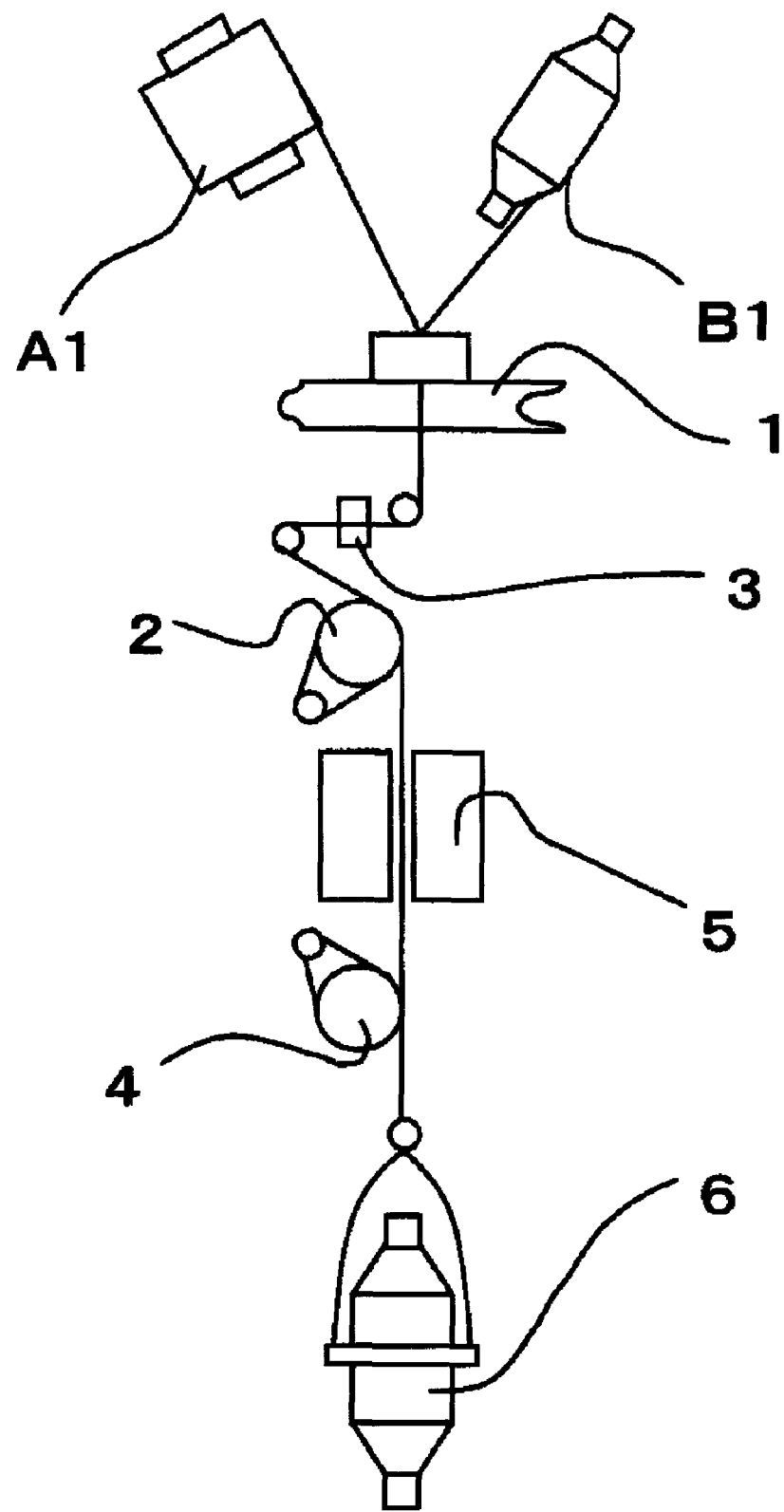
FIG. 4 A schematic view showing one example of a combined filament yarn step of the invention.

The cross sectional shape of the flat cross section fiber will be described by reference to FIG. 2. FIGS. 2A to 2E each schematically show the cross sectional shape of each flat cross section fiber, wherein FIG. 2A shows the shape such that 3 round cross section single yarns are bonded together; FIG. 2B, 4 round cross section single yarns; and FIG. 2C, 5 round cross section single yarns.

Namely, in the preferred case as the cross sectional shape of the flat cross section fiber, the cross section is in the shape such that the round cross section single yarns are bonded together in the longitudinal direction (major axis direction). More specifically, the cross section has a shape such that the convex part and the convex part (mountain and mountain), and the concave part and the concave part (valley and valley) overlap each other symmetrically. As described above, the number of the round cross section single yarns is preferably 3 to 6. When the number of the round cross section single yarns is 2, only the softness close to that when the round cross section fiber is merely formed into a fabric. The anti-transparency, low air permeability, and water absorption may also be deteriorated. On the other hand, when the number of the round cross section single yarns exceeds 7, the fiber becomes more likely to be broken, which may result in reduction of the abrasion resistance.

Then, a description will be given by reference to FIG. 3. In the invention, the flatness expressed as the ratio A/B of the length of the maximum diameter A (major axis) and the length of the maximum diameter B (minor axis) orthogonal to the major axis of the flat cross section polyester fiber is preferably 3 to 6. Undesirably, when the flatness is less than 3, the soft feeling tends to be reduced; and when the flatness is larger than 6, sticky feeling tends to occur.

Further, from the viewpoint of eliminating the sticky feeling, and improving the water absorption when the flat cross section polyester fiber is used, and is made into a fabric, the secondary modification degree expressed as the ratio B/C of the maximum diameter B and the minimum diameter C (the minimum diameter of the bonding part of the round cross section single yarns) of the minor axis of the flat cross section polyester fiber is preferably $1.0 < B/C < 5.0$. Namely, in the state where a plurality of the flat cross section fibers aggregate, the moisture content diffuses passing through the concave part of the cross section by the capillarity. Therefore, more excellent water absorption performances can be obtained as compared with the round cross section fiber. However, when the secondary modification degree is 1.0, merely a flat fiber is formed, so that the sticky feeling occurs, and the water absorption is also eliminated. On the other hand, when the secondary modification degree is 5 or more, no sticky feeling occurs, and the water absorption can also be imparted. However, the bonding part of the round cross section single yarns becomes too short, resulting in reduction of the strength of the flat cross section fiber. Accordingly, the cross section becomes more likely to be broken, and other defects occur. From these viewpoints, B/C is preferably $1.0<B/C<5.0$, and more preferably $1.1 \leq B/C \leq 2$.

The single yarn fineness of the flat cross section fiber, and the total fineness of the multifilament formed by the flat cross section fibers have no particular restriction. However, when the flat cross section fiber is used for closing purpose, it is preferable that the single yarn fineness is set at 0.3 to 3.0 dtex, and that the total fineness of the multifilament is set at 30 to 200 dtex.

(Combined Filament Yarn/Composite Yarn)

The normal pressure cationic dyeable polyester multifilament of the invention can be mixed with other raw yarns by a known method. As another raw yarn, preferably, a polyester multifilament or the like having a larger hot water shrinkage percentage than that of the normal pressure cationic dyeable polyester multifilament of the invention is used, and is formed into a differential shrinkage combined filament yarn. Herein, the difference in hot water shrinkage percentage is preferably 20% or more. Under the conditions, after weaving of the combined filament yarn, the low shrinkage yarn forms a sheath part by hot water shrinkage in the dyeing step, and the like, resulting in a uniformly and sharply dyeable fabric. The combined filament yarn is preferably subjected to an intermingling treatment at about 60 intermingling points per meter by an air intermingling nozzle of interlace or the like. Herein, the hot water denotes 98° C. or 98° C. to 100° C. water.

The typical combined filament yarn step of the invention will be described by reference to the accompanying drawing (FIG. 4). The normal pressure cationic dyeable polyester multifilament (A1) of the invention and the polyester multifilament (B1) having a larger hot water shrinkage percentage than that of the normal pressure cationic dyeable polyester multifilament (A1) are doubled to be fed to a feed roller (1). Then, by means of an air jet nozzle for intermingling (3), the yarn is intermingled. Thereafter, the yarn is pre-heated by a preheating roller (2), and is drawn to a prescribed ratio by a take-up roller (4). At this step, by a set heater (5) provided between the preheating roller and the take-up roller, the combined filament yarn is heat set. Further, the yarn taken up by the take-up roller is continuously wound by a winding device disposed therebehind, resulting in the objective combined filament yarn package (6).

On the other hand, when the normal pressure cationic dyeable polyester multifilament (A1) of the invention is not used, with a conventional normal pressure cationic dyeable yarn, the strength cannot be ensured, and yarn breakage and fluffing often occur. By these and other disadvantages, the combined filament texturing conditions are deteriorated. Further, as the differential shrinkage combined filament yarn, shrinkage difference is difficult to ensure, thus resulting in a marbled tone upon dyeing. As a result, high quality fabric cannot be obtained.

Incidentally, for the combined filament yarn as described above, as the normal pressure cationic dyeable polyester multifilament, there can be selected a normal pressure cationic dyeable polyester multifilament which has a single yarn fineness of 7 dtex or less, in which the number of bound single yarns is 24 or more, and which has a strength of 2.0 cN/dtex or more, and an elongation of 60% or less. Further, the hot water shrinkage percentage of the normal pressure cationic dyeable polyester multifilament is preferably 22% or less.

Whereas, the composite yarns in the invention denote yarns including a composite false twisted textured yarn, and other combined filament yarns, plied twisted yarn, and covering yarn described later. Further, as one of the combined filament yarns, mention may be made of a composite false twisted textured yarn. Further, for such a composite yarn, by the use of a fiber using the copolymerized polyester of the invention, the fiber part thereof can impart normal pressure cationic dyeability, and can achieve the unprecedented fiber strength.

(False Twisted Textured Yarn)

When using the copolymerized polyester of the invention, a false twisted textured yarn is produced, the multifilament as shown below is preferably prepared. Namely, adjustment is achieved within the range of the foregoing yarn making method, thereby to implement a normal pressure cationic dyeable polyester multifilament which has a single yarn fineness of 1.5 dtex or less, in which the number of bound single yarns is 5 or more, and a strength of 1.5 cN/dtex or more, and an elongation of 60% or less. Herein the single yarn fineness is preferably 1.5 dtex or less. When the single yarn fineness exceeds 1.5 dtex, as the fiber for clothing purpose, the texture is hard. Further, for the normal pressure cationic dyed fabric, the synthetic fiber-like appearance is undesirably strong. Further, the number of the bound single yarns is preferably 5 or more. When the number is less than 5, undesirably the weavability is reduced, or the texture becomes hardened.

The fiber strength of the normal pressure cationic dyeable polyester multifilament is preferably 1.5 cN/dtex or more. When the strength is less than 1.5 cN/dtex, undesirably, yarn breakage and fluffing tend to occur in the false twisting step, or the tear strength is reduced upon formation into a fabric. The strength is preferably 2.0 to 5.0 cN/dtex. Whereas, the elongation is 60% or less, and particularly, for clothing purpose, it is preferably 20 to 40%. When the elongation exceeds 60%, the shrinkage in the direction of width during heat setting upon formation into a fabric becomes too large. Thus, the fabric surface may become wavy, which is undesirable from the viewpoint of the fabric quality.

Figure 5:
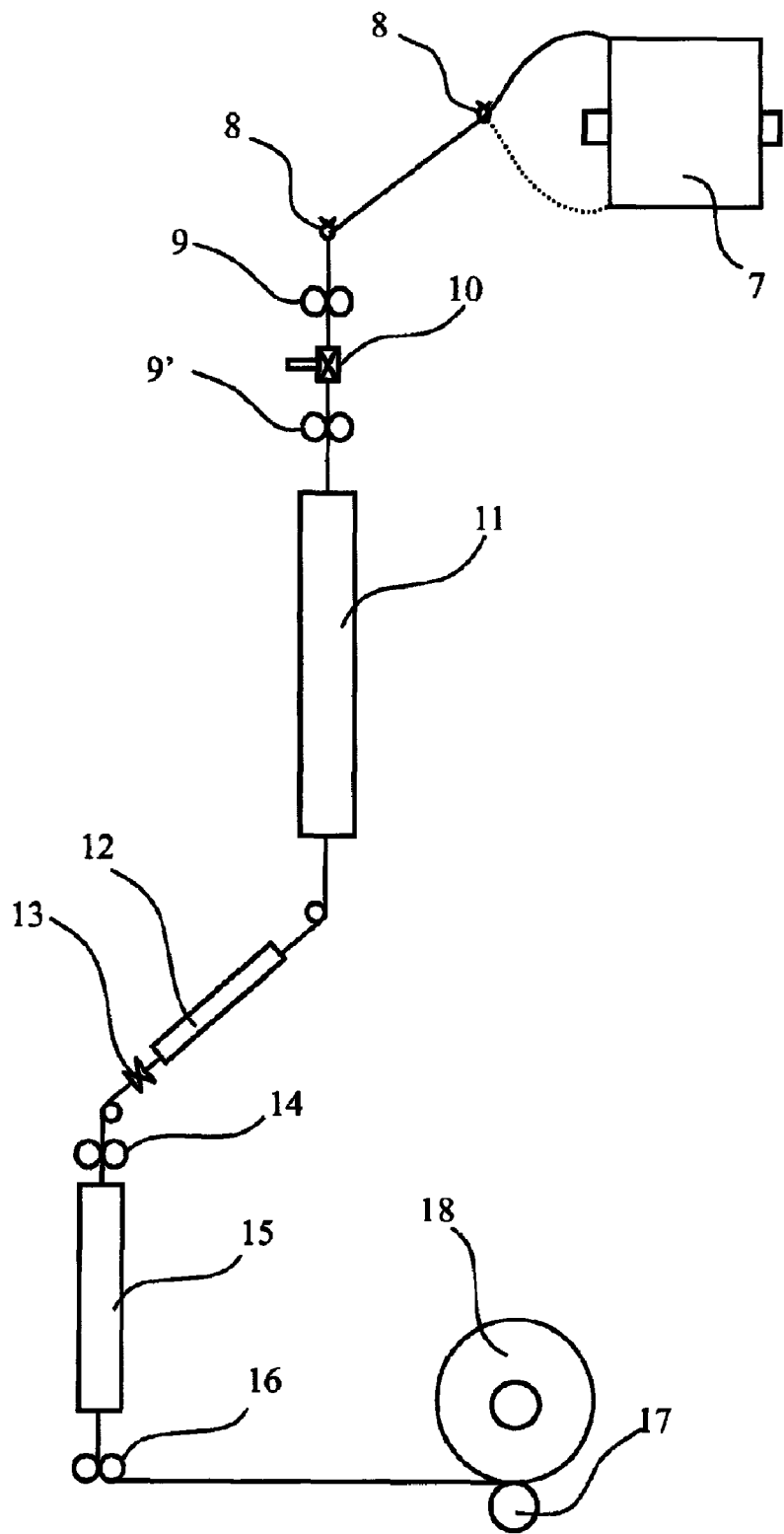
FIG. 5 A schematic view showing one example of a false twisted textured yarn step of the invention.

The normal pressure cationic dyeable polyester multifilament is subjected to false twisting, resulting in the normal pressure dyeable polyester false twisted textured yarn of the invention. As the false twisting method, a known method can be adopted. For example, by means of a false twisting machine equipped with a contact type heater as shown in FIG. 5, drawing false twisting is preferably carried out at a first false twisting heater temperature of 200 to 500° C.

(Covering Yarn)

The elastomer yarn as the core yarn for use in the covering yarn of the invention can be properly selected from those conventionally known as elastomer yarns. Out of these, elastomer yarns formed of conventionally used polyurethane elastomers, polyether/polyester block copolymers, polyether, synthetic rubber elastic body are preferably used. As polyurethane elastomers, there can be exemplified polyurethane elastomers obtainable from reaction of a divalent hydroxyl group-containing diol component such as polyester diol, polyether diol, or polycarbonate diol, polyisocyanate components, preferably, diisocyanate components (e.g., diphenylmethane diisocyanate), and low molecular chain extenders (e.g., low molecular diols such as ethylene glycol), or, if required, further reaction with a chain terminator. Further, as the polyether/polyester block copolymers, there can be exemplified block copolymers including polybutylene terephthalate type polyester as the hard segment, and polyoxybutylene glycol as the soft segment. Incidentally, for the polyurethane elastomers or the polyether/polyester block copolymers, those containing, if required, an ultraviolet absorber and an antioxidant added thereto are preferably used. The production method of the covering yarn of the normal pressure cationic dyeable polyester yarn in the invention is not particularly restricted by examples. Conventionally known methods may be adopted.

As the covering means, there is a method by twisting using a hollow spindle while applying draft (elongation) to the elastomer yarn, or a method by air blending. Generally, the former producing a large covering effect is excellent in quality of fabric. Herein, the number of covering twists is preferably 200 T/m or more. When the number is less than this value, the covering effect is insufficient, so that the quality of the finished woven fabric is insufficient. Particularly, with the multifilament (raw yarn) not subjected to false twisting, the number of covering twists is preferably 300 T/m or more. When the number of covering twists is 300 T/m or more, the number of necessary twists can be arbitrarily set. However, the production cost increases. Therefore, the upper limit thereof is practically up to about 1000 T/m. On the other hand, when the number of additional twists is 300 T/m or more, the intended effect of the invention is sufficiently exerted. However, there is the optimum number of twists according to the type of the yarn forming the covering yarn. Thus, the foregoing range is non-limiting. Whereas, when additional twisting is carried out, twisting in the same direction as the covering direction is favorable. In examples of the invention, by the use of 44-dtex polyether ester type elastomer yarn of the invention and a hollow spindle device, production was carried out at 500 T/m.

(Yarn Making Method of Outer Layer Part Yarn in Composite False Twisted Textured Yarn)

The copolymerized polyester obtained in the foregoing manner is made into yarn with the foregoing method. For example, the following method can be mentioned. The resulting normal pressure cationic dyeable polyester is extruded in a fiber form in the molten state. It is subjected to melt spinning at a rate of 500 to 3500 m/min, and drawn and heat treated. Alternatively, preferably mention may be made of a method in which the normal pressure cationic dyeable polyester is subjected melt spinning and drawn at a rate of 1000 to 5000 m/min, a method in which melt spinning is carried out at a rate as high as 5000 m/min or more, and a drawing step may be omitted according to the use, and other methods. The elongation of the normal pressure cationic dyeable polyester fiber of the outer layer part yarn is preferably 45% or more. When the elongation is less than 45%, the bulkiness of the composite false twisted textured yarn having a proper structure cannot be undesirably obtained.

The single fiber fineness of the outer layer part yarn is preferably 4 dtex or less. When the fineness exceeds 4 dtex, a core sheath structure is difficult to implement for blending. On the other hand, the lower limit of the single fiber fineness has no particular restriction. However, the fineness is preferably 0.1 dtex or more from the viewpoints of being capable of practically forming a fiber, and not remarkably impairing the abrasion resistance of the fabric. The cross sectional shape of the normal pressure cationic dyeable polyester fiber of the outer layer part yarn of the invention can be set to be a given shape according to the use or the like. For example, there can be exemplified, other than a circle, modified cross section of a triangle, a flat shape, a star, V shape, or the like, or hollow cross sections thereof.

(Core Yarn in Composite False Twisted Textured Yarn)

Then, as the core yarn of the composite false twisted textured yarn of the invention, a polyester fiber is preferable, and the boiling water shrinkage percentage is preferably 10% or less. When the boiling water shrinkage percentage exceeds 10%, the bulkiness of the composite false twisted textured yarn cannot be undesirably ensured.

(Production Method of Composite False Twisted Textured Yarn)

The composite false twisted textured yarn can be obtained in the following manner. The core yarn and the outer layer part yarn are doubled, and are subjected to an air intermingling treatment. Then, the yarns go through a drawing false twisting step by means of a non-contact heater. In this case, both may be properly used in a ratio of core yarn:outer layer part yarn=25:75 to 75:25 (weight ratio). Air intermingling may be any of interlace and taslan processings. Specifically, the step of FIG. 6 can be shown. Herein, the yarns are subjected to a heat treatment by a heater while applying overfeed after imparting intermingling. Then, the core yarn shrinks, and the outer layer part yarn hardly shrinks, or self elongates. This causes a difference in yarn length between the core yarn and the outer layer part yarn. When a fabric is formed by using the yarn, the difference in yarn length causes swelling and the spun-like property of the fabric to be exerted.

(Polyester Fiber Having Specified Strength and Dyeability)

Whereas, the present invention also covers a polyester fiber having a main repeating unit including ethylene terephthalate, characterized by the following: the breaking strength is 3.0 cN/dtex or more; and a plain woven fabric is produced from the polyester fiber, and the plain woven fabric is dyed under the following normal pressure cationic dyeing conditions, and the plain woven fabric after dyeing is measured by a color difference meter, and the L* value at this step is 24 or less. In order to obtain such a polyester fiber, the following method can be mentioned. Namely, the polyester fiber can be produced in the following manner. A copolymerized polyester has a main repeating unit including ethylene terephthalate, and the copolymerized polyester contains, in an acid component forming the copolymerized polyester, a metal salt of sulfoisophthalic acid (A) and a compound (B) expressed as the formula (I) in such a state as to simultaneously satisfy the mathematical expressions (1) and (2). The copolymerized polyester is subjected to melt spinning/drawing treatments under proper conditions. A false twisted textured yarn, a composite yarn, and a covering yarn using the fiber can also be produced according to the foregoing conditions.

EXAMPLES

Below, the invention will be specifically described by way of examples. However, the invention is not limited to these examples. Incidentally, the analysis items in examples and the like are measured by the methods described below.

(1) Intrinsic Viscosity:

A polyester sample is dissolved in orthochlorophenol at 100° C. for 60 minutes. The resulting dilute solution is measured at 35° C. by means of an Ubbelohde viscometer. The intrinsic viscosity is determined from the measured value. Incidentally, in Tables 1 and 2, the intrinsic viscosity of a chip is referred to as ηC, and the intrinsic viscosity of an undrawn yarn after spinning is referred to as ηF. Incidentally, when inactive particles are added, the inactive particles present in the dilute solution are removed by filtration before transferring the dilute solution to the viscometer.

(2) Diethylene Glycol (DEG) Content:

Using hydrazine hydrate (hydrazine hydrate), a polyester sample is decomposed. The content of diethylene glycol in the decomposition product is measured by means of a gas chromatography ((HP6850 model) manufactured by Hewlett-Packard Co.).

(3) Glass Transition Temperature (Tg) of Polymer:

Using a differential scanning calorimeter (DSC: Q10 model manufactured by Seiko Instruments Inc.), measurement is carried out at a programming rate=20° C./min.

(4) Fineness of Fiber:

Measurement is carried out according to the method described in Japanese Industrial Standard, JIS L1013.

(5) Tensile Strength (Breaking Strength), and Tensile Elongation (Breaking Elongation) of Polyester Fiber Measurement is carried out according to the method described in Japanese Industrial Standard, JIS L1013: 1999 8.5.

(6) Hot Water Shrinkage Percentage:

The boiling water shrinkage percentage is measured according to Japanese Industrial Standard, JIS L 1013.

(7) Total Number of Crimps (TC):

A false twist crimp textured yarn sample is applied with a tension of 0.044 cN/dtex, and wound to a skein frame to form about 3300-dtex skein. On one end of the resulting skein, a load of 0.00177 cN/dtex+0.177 cN/dtex is imposed to measure the length after an elapse of 1 minute (L0). Then, the sample is treated in 100° C. boiling water for 20 minutes with the load of 0.177 cN/dtex removed. After the boiling water treatment, the load of 0.177 cN/dtex is removed, and only a load of, 0.00177 cN/dtex is imposed. Thus, the sample is air dried for 24 hours in a free state. On the air dried sample, a load of 0.00177 cN/dtex+0.177 cN/dtex is imposed again. Thus, the length after an elapse of 1 minute (L1) is measured. Then, the load of 0.177 cN/dtex is removed, and the length after an elapse of 1 minute (L2) is measured. Then, the total crimp ratio TC (%) is calculated by the following equation. This measurement is carried out 10 times. Thus, the total number of crimps is expressed as the average value thereof.

$$\text{Total crimping ratio } TC\ (\%) = ((L1-L2)/L0) \times 100$$

(8) Normal Pressure Cationic Dyeability A Method:

A tube knitted fabric made with a multifilament yarn is dyed in a dye solution of 0.2 g/L CATHILON BLUE CD-FRLH), 0.2 g/L CD-FBLH (both are cationic dyeable dye, manufactured by HODOGAYA Chemical Co., Ltd.), 3 g/L sodium sulfate, and 0.3 g/L acetic acid at 100° C. for 1 hour at a bath ratio of 1:50. Thus, the degree of exhaustion is determined by the following equation:

$$\text{Degree of exhaustion} = (OD_0 - OD_1)/OD_0$$

$OD_0$: 576 nm absorbance of dye before dyeing
$OD_1$: 576 nm absorbance of dye after dyeing In examples of the invention, a sample with a degree of exhaustion of 98% or more is judged as being favorable in dyeability.

(9) Normal Pressure Cationic Dyeability B Method:

A tube knitted fabric manufactured by a multifilament yarn is dyed in a dyeing solution of 2% of ESTROL BRILLIANT BLUE N-RL, 3 g/L sodium sulfate, and 0.5 g/L acetic acid at a bath ratio of 1:50 at each temperature shown in Tables 3 to 5, and the like, for 1 hour, resulting in a dyed fabric. For the dyed fabric, the lightness L* value expressed in L*a*b* color display recommended by International Commission on Illumination (CIE), specified in JIS Z 8729-1980 is measured using MACBETH COLOR-EYE model M-2020PL. The lightness L* is used as the representative value of the density of dye.

(10) Normal Pressure Cationic Dyeability C Method

A polyester plain woven fabric is made from a polyester fiber sample with an ordinary method. Then, a black cationic dye: AIZEN CATHILON BLACK BL-DP (manufactured by HODOGAYA Chemical Co., Ltd.) is used in such an amount as to be 15% of based on the amount of the polyester plain woven fabric. As a dyeing aid, 3 g/L sodium sulfate, and 0.3 g/L acetic acid are added thereto. Thus, a plain woven fabric is obtained under the conditions of a bath ratio of 1:50, 98° C., and for 1 hour, and is subjected to a dyeing treatment. The resulting plain woven fabric after dyeing is subjected to colorimetry by means of a color difference meter (CE-3000 model) manufactured by Greta Macbeth Co., to determine L*. A sample with a L* value of 24 or less is judged as being favorable in dark color property.

(11) Yarn Making Property

Melt spinning is continuously carried out for 1 week at composite spinning equipment. Then, the number of yarn breakages is recorded, and the number of spinning yarn breakages per spindle per day is referred to as the number of occurrences of spinning yarn breakage. However, the number of yarn breakages due to the unnatural or mechanical factors is excluded from the number of yarn breakages. The spinnability is judged based on whether the number of spinning yarn breakages is large or small.

AA: The number of spinning yarn breakages is small, and continuous spinning can be carried out with stability.

CC: The number of spinning yarn breakage is large, and continuous spinning cannot be carried out with stability.

(12) Filament Combining Step Condition:

Evaluation is carried out based on whether yarn breakage or fluffing has occurred or not.

AA: No yarn breakage nor fluff occurs, and the condition is favorable

CC: Yarn breakage and fluffing are observed, and the condition is unfavorable.

(13) False Twisting Step Condition:

Evaluation was carried out based on the number of formed fluffs in a false twisted textured yarn.

By means of a DT-104 model fluff counter device manufactured by TORAY Industries, Inc., a polyester false twisted textured yarn sample is continuously measured at a speed of 500 m/min for 20 minutes to measure the number of formed fluffs. Thus, the condition is expressed as the number per ten thousand meters in sample length.

Favorably less fluffs (less than 10 fluffs/ten thousand meters)

BB Slightly large number of fluffs

CC A large number of fluffs, and bad quality (10 fluffs/ten thousand meters)

(14) Fabric Softness (Soft Feeling)

Level 1: Soft and flexible touch

Level 2: Slightly insufficient soft feeling, but evoking repulsion

Level 3: Dry touch or hard touch.

(Production of Copolymerized Polyester and Copolymerized Polyester Composition)

Example 1

To a mixture of 100 parts by weight of dimethyl terephthalate, 4.1 parts by weight of sodium dimethyl 5-sulfoisophthalate, and 60 parts by weight of ethylene glycol, 0.03 part by weight of manganese acetate and 0.12 part by weight of sodium acetate trihydrate were added. While gradually raising the temperature from 140° C. to 240° C., and distilling methanol resulting from the reaction out of a reactor, an ester exchange reaction was effected. Thereafter, 0.03 part by weight of normal phosphoric acid was added thereto to terminate the ester exchange reaction.

Thereafter, to the reaction product of the ester exchange reaction, 0.05 part by weight of antimony trioxide, 2.8 parts by weight of tetrabutyl phosphonium 5-sulfoisophthalate, 0.3 part by weight of tetraethyl ammonium hydroxide, and 0.003 part by weight of triethylamine were added thereto, and the mixture was transferred to a polycondensation tank. The temperature in the inside of the polycondensation tank was increased to 285° C. The inside of the polycondensation tank was kept at high vacuum of 30 Pa or less, thereby to effect a polycondensation reaction. At the stage at which the value of the stirrer power of the polycondensation tank reached a prescribed electric power, or at the stage at which a prescribed time elapsed, the polycondensation reaction was terminated. Then, the resulting copolymerized polyester was formed into chips according to an ordinary method.

The copolymerized polyester chip thus obtained was dried at 140° C. for 5 hours, and then, a raw yarn of the 330 dtex/36 filament was formed at a spinning temperature of 285° C. and at a winding rate of 400 m/min. Then, the yarn was drawn to 4.0 times by simultaneously drawing and false twisting to obtain a false twisted textured yarn of 83 dtex/36 filament. Further, a relaxed heat treatment was carried out according to an ordinary method. The details of the production conditions and evaluation results of the copolymerized polyester are shown in Table 1.

Examples 2 to 4, Comparative Examples 1 to 6

The same experiment was carried out in the same manner as in Example 1, except that the amounts of sodium dimethyl 5-sulfoisophthalate and tetrabutyl phosphonium 5-sulfoisophthalate to be added in Example 1 were changed so as to be the values shown in Table 1. The details of the production conditions and evaluation results of the copolymerized polyester are shown in Table 1.

Example 5

To a mixture of 100 parts by weight of dimethyl terephthalate, 4.1 parts by weight of sodium dimethyl 5-sulfoisophthalate, and 60 parts by weight of ethylene glycol, 0.03 part by weight of manganese acetate, and 0.12 part by weight of sodium acetate trihydrate were added thereto. While gradually raising the temperature from 140° C. to 240° C., and distilling methanol resulting from the reaction out of a reactor, an ester exchange reaction was effected. Thereafter, 0.03 part by weight of normal phosphoric acid was added thereto to terminate the ester exchange reaction.

Thereafter, to the reaction product of the ester exchange reaction, 0.05 part by weight of antimony trioxide, 2.8 parts by weight of tetrabutyl phosphonium 5-sulfoisophthalate, 0.3 part by weight of tetraethyl ammonium hydroxide, and 0.003 part by weight of triethylamine were added thereto, and further, 1.5 parts by weight of adipic acid was added thereto. The mixture was transferred to a polycondensation tank. The temperature in the inside of the polycondensation tank was increased to 285° C. The inside of the polycondensation tank was kept at high vacuum of 30 Pa or less, thereby to effect a polycondensation reaction. At the stage at which the value of the stirrer power of the polycondensation tank reached a prescribed electric power, or at the stage at which a prescribed time elapsed, the polycondensation reaction was terminated. Then, the resulting copolymerized polyester was formed into chips according to an ordinary method. The subsequent treatments were carried out in the same manner as in Example 1. The details of the production conditions and evaluation results of the copolymerized polyester are shown in Table 1.

TABLE 1

| | Compound A [mol %] | Compound B [mol %] | A + B [mol %] | B/(A + B) | Other copolymerizable component | | Tg [° C.] | DEG [wt %] | ηC [dL/g] | ηF [dL/g] | Tensile strength # | TC [%] | Degree of exhaustion [%] A method | Dyeability L* value C method |
|---|---|---|---|---|---|---|---|---|---|---|---|---|---|---|
| | | | | | Kind | Copolymerization amount | | | | | | | | |
| Ex. 1 | 2.45 | 1.05 | 3.5 | 0.3 | — | — | 78 | 1.9 | 0.64 | 0.60 | 3.2 | 13 | 98 | 22 |
| Ex. 2 | 1.75 | 1.75 | 3.5 | 0.5 | — | — | 79 | 2.0 | 0.66 | 0.62 | 3.3 | 13 | 98 | 22 |
| Ex. 3 | 3.15 | 1.35 | 4.5 | 0.3 | — | — | 79 | 2.2 | 0.65 | 0.61 | 3.1 | 12 | 99 | 18 |
| Ex. 4 | 2.25 | 2.25 | 4.5 | 0.5 | — | — | 78 | 1.9 | 0.67 | 0.61 | 3.2 | 12 | 99 | 18 |
| Ex. 5 | 2.45 | 1.05 | 3.5 | 0.3 | AA | 2 mol % | 72 | 1.8 | 0.60 | 0.58 | 3.0 | 11 | 99 | 22 |
| Comp. Ex. 1 | 0.70 | 2.8 | 3.5 | 0.8 | — | — | 79 | 1.9 | 0.53 | 0.49 | 2.5 | 12 | 98 | 22 |
| Comp. Ex. 2 | 4.05 | 0.45 | 4.5 | 0.1 | — | — | 78 | 2.1 | 0.41 | 0.39 | 2.2 | 13 | 99 | 18 |
| Comp. Ex. 3 | 3.15 | 0.35 | 3.5 | 0.1 | — | — | 79 | 2.1 | 0.45 | 0.41 | 2.4 | 12 | 98 | 22 |
| Comp. Ex. 4 | 0.90 | 3.60 | 4.5 | 0.8 | — | — | 78 | 2.1 | 0.53 | 0.43 | 2.1 | 13 | 99 | 18 |
| Comp. Ex. 5 | 2.75 | 2.75 | 5.5 | 0.5 | — | — | 77 | 2.2 | 0.45 | 0.41 | 1.9 | 12 | 99 | 16 |
| Comp. Ex. 6 | 1.25 | 1.25 | 2.5 | 0.5 | — | — | 79 | 1.4 | 0.65 | 0.60 | 3.5 | 14 | 90 | 26 |

: The unit of the tensile strength is cN/dtex.
AA: Adipic acid
A method: Evaluation with the A method of normal pressure cationic dyeability.
C method: Evaluation with the C method of normal pressure cationic dyeability.

Example 6

To a mixture of 100 parts by weight of dimethyl terephthalate, 4.1 parts by weight of sodium dimethyl 5-sulfoisophthalate, and 60 parts by weight of ethylene glycol, 0.03 part by weight of manganese acetate and 0.12 part by weight of sodium acetate trihydrate were added. While gradually raising the temperature from 140° C. to 240° C., and distilling methanol resulting from the reaction out of a reactor, an ester exchange reaction was effected. Thereafter, 0.03 part by weight of normal phosphoric acid was added thereto to terminate the ester exchange reaction.

Thereafter, to the reaction product of the ester exchange reaction, 0.05 part by weight of antimony trioxide, 2.8 parts by weight of tetrabutyl phosphonium 5-sulfoisophthalate, 0.3 part by weight of tetraethyl ammonium hydroxide, 0.003 part by weight of triethylamine, and as the inactive particles, 2.6 parts by weight of 20 wt % ethylene glycol slurry of tribasic calcium phosphate with an average particle diameter of 0.06 µm were added thereto, and then the mixture was transferred to a polycondensation tank. The temperature in the inside of the polycondensation tank was increased to 285° C. The inside of the polycondensation tank was kept at high vacuum of 30 Pa or less, thereby to effect a polycondensation reaction. At the stage at which the value of the stirrer power of the polycondensation tank reached a prescribed electric power, or at the stage at which a prescribed time elapsed, the polycondensation reaction was terminated. Then, the resulting copolymerized polyester composition was formed into chips according to an ordinary method.

The copolymerized polyester chip thus obtained was dried at 140° C. for 5 hours, and then, a raw yarn of 330 dtex/36 filament was formed at a spinning temperature of 285° C. and at a winding rate of 400 m/min. Then, the raw yarn was drawn to 4.0 times to obtain a drawn yarn of 83 dtex/36 filament. Then, the resulting polyester drawn yarn was used for the warp and the weft to weave a plain woven fabric. The fabric was refined, and dried by an ordinary method, and then, was subjected to heat setting at 180° C. Further, a part of the heat set fabric was subjected to an alkali peeling treatment so as to achieve a reduction ratio of 20 wt %. The details of the production conditions and evaluation results of the copolymerized polyester composition are shown in Table 2.

Examples 7 to 9, Comparative Examples 7 to 14

The same experiment was carried out in the same manner as in Example 6, except that the amounts of sodium dimethyl 5-sulfoisophthalate and tetrabutyl phosphonium 5-sulfoisophthalate to be added in Example 6 were changed so as to be the values shown in Table 2. The details of the production conditions and evaluation results of the copolymerized polyester composition are shown in Table 2.

Examples 10 to 11

The same experiment was carried out in the same manner as in Example 6, except that the inactive particles to be added in Example 6 were changed to those having the properties shown in Table 2. The details of the production conditions and evaluation results of the copolymerized polyester composition are shown in Table 2.

TABLE 2

| | Compound A [mol %] | Compound B [mol %] | A + B [mol %] | B/(A + B) | Inorganic particles | | | Tg [° C.] | DEG [wt %] | ηC [dL/g] | Dyeability L* value C method |
|---|---|---|---|---|---|---|---|---|---|---|---|
| | | | | | Kind | Particle diameter [µm] | Added amount [wt %] | Coarse particle [wt %] | | | |
| Ex. 6 | 2.45 | 1.05 | 3.5 | 0.3 | CPP | 0.06 | 0.5 | 1 | 79 | 1.9 | 0.63 | 22 |
| Ex. 7 | 1.75 | 1.75 | 3.5 | 0.5 | CPP | 0.06 | 0.5 | 1 | 78 | 2.0 | 0.64 | 22 |
| Ex. 8 | 3.15 | 1.35 | 4.5 | 0.3 | CPP | 0.06 | 0.5 | 1 | 78 | 2.2 | 0.63 | 18 |
| Ex. 9 | 2.25 | 2.25 | 4.5 | 0.5 | CPP | 0.06 | 0.5 | 1 | 78 | 1.9 | 0.65 | 18 |
| Ex. 10 | 2.45 | 1.05 | 3.5 | 0.3 | CCN | 0.10 | 0.5 | 2 | 79 | 1.9 | 0.64 | 22 |
| Ex. 11 | 2.45 | 1.05 | 3.5 | 0.3 | BSO | 0.25 | 0.5 | 10 | 79 | 1.9 | 0.65 | 22 |
| Comp. Ex. 7 | 0.70 | 2.8 | 3.5 | 0.8 | CPP | 0.06 | 0.5 | 1 | 78 | 1.9 | 0.53 | 22 |
| Comp. Ex. 8 | 4.05 | 0.45 | 4.5 | 0.1 | CPP | 0.06 | 0.5 | 1 | 78 | 2.1 | 0.41 | 18 |
| Comp. Ex. 9 | 3.15 | 0.35 | 3.5 | 0.1 | CPP | 0.06 | 0.5 | 1 | 79 | 2.1 | 0.45 | 22 |
| Comp. Ex. 10 | 0.90 | 3.60 | 4.5 | 0.8 | CPP | 0.06 | 0.5 | 1 | 79 | 2.1 | 0.53 | 18 |
| Comp. Ex. 11 | 3.85 | 1.65 | 5.5 | 0.3 | CPP | 0.06 | 0.5 | 1 | 78 | 2.3 | 0.43 | 16 |
| Comp. Ex. 12 | 2.75 | 2.75 | 5.5 | 0.5 | CPP | 0.06 | 0.5 | 1 | 79 | 2.2 | 0.45 | 16 |
| Comp. Ex. 13 | 1.75 | 0.75 | 2.5 | 0.3 | CPP | 0.06 | 0.5 | 1 | 78 | 1.5 | 0.65 | 26 |
| Comp. Ex. 14 | 1.25 | 1.25 | 2.5 | 0.5 | CPP | 0.06 | 0.5 | 1 | 78 | 1.4 | 0.65 | 26 |

Kind of inactive particles:
CPP: Tribasic calcium phosphate,
CCN: calcium carbonate
BSO: barium sulfate
A method: Evaluation with the A method of normal pressure cationic dyeability.
C method: Evaluation with the C method of normal pressure cationic dyeability.

Production of Multifilament, Combined Filament Yarn, False Twisted Textured Yarn, and Covering Yarn Example 12

The copolymerized polyester chip obtained in Example 1 was dried at 140° C. for 5 hours. Then, by means of a spinneret having 24 orifice holes, a 330 dtex/24 filament raw yarn was formed at a spinning temperature of 285° C. at a winding rate of 400 m/min. Then, the raw yarn was drawn to 4.0 times, resulting in an 83 dtex/24 filament drawn yarn. The evaluation results of the drawn yarn are shown in Table 3.

Examples 13 to 15, Comparative Examples 15 to 18

The same experiment was carried out in the same manner as in Example 12, except that the amounts of sodium dimethyl 5-sulfoisophthalate and tetrabutyl phosphonium 5-sulfoisophthalate to be added in Example 12 were changed so as to be the values shown in Table 3. The evaluation results of the drawn yarn are shown in Table 3.

Example 16

The same experiment was carried out in the same manner as in Example 15, except that a spinneret having 36 orifice holes was used for spinning discharge in Example 15. The evaluation results of the drawn yarn are shown in Table 3.

Example 17

Using the multifilament yarn obtained in Example 12, and using, as the counter yarn, a multifilament of 33 dtex/12 filament yarn formed of polyethylene terephthalate, and with a hot water shrinkage percentage of 40%, a combined filament yarn with a number of intermingling points of 55 per meter was formed in the combined filament yarn step shown in FIG. 4. The combined filament yarn step condition was favorable, and less fluffing occurred. A tube woven fabric was formed using the combined filament yarn in the same manner as in Example 12. Then, the normal pressure cationic dyeability and the site forming the core sheath structure of the invention after dyeing were observed. The evaluation results of the yarn are shown in Table 3.

Example 18

The same experiment was carried out in the same manner as in Example 17, except that the multifilament yarn obtained in Example 13 was used in place of the multifilament yarn obtained in Example 12. The core sheath structure was formed in which the multifilament of the invention uniformly formed the sheath part. The evaluation results of the yarn are shown in Table 3.

Example 19

The multifilament of Example 12, and as an elastomer yarn, a 44-dtex polyether ester type elastomer yarn were prepared. By using these yarns, by means of a hollow spindle device, a covering yarn configured such that the multifilament of Example 12 covered around the elastomer yarn was formed under such conditions that the number of covering twists is 500 T/m. The strength and elongation of the multifilament were favorable, and hence the covering step condition was favorable. The evaluation of the normal pressure cationic dyeability with the tube woven fabric was also favorable. The evaluation results of the yarn are shown in Table 3.

Comparative Example 19

The same experiment was carried out in the same manner as in Comparative Example 18, except that a spinneret having 12 orifice holes was used for spinning and discharging in Comparative Example 18. The evaluation results of the yarn are shown in Table 3.

Comparative Example 20

Evaluation was carried out in the same manner as in Example 12, using polyethylene terephthalate in which the A component and the B component were not copolymerized. The evaluation results of the yarn are shown in Table 3.

Comparative Example 21

A combined filament yarn was formed and evaluated in the same manner as in Example 17, using the multifilament of Comparative Example 15. In the blending process, a large number of fluffs occur due to the insufficient strength of the raw yarn, so that only insufficient quality as a core sheath structured combined filament yarn can be achieved. Further, defective intermingling results in exposed core part, resulting in marble-like appearance. The evaluation results of the yarn are shown in Table 3.

Comparative Example 22

A combined filament yarn was formed and evaluated in the same manner as in Example 17, using the multifilament of Comparative Example 16. The evaluation results of the yarn are shown in Table 3.

Comparative Example 23

A covering yarn was formed in the same manner as in Example 19, using the multifilament of Comparative Example 15. In the covering process, a large number of fluffs occur due to the insufficient strength of the raw yarn, and the step condition was bad. The evaluation results of the yarn are shown in Table 3.

TABLE 3

| | Multifilament | | | | | | | | Blended spun yarn Step condition | Dyeability: C method (L* value) 98° C. | Comprehensive evaluation |
|---|---|---|---|---|---|---|---|---|---|---|---|
| | Component A* | Component B* | A + B* | B/(A + B) | Number of single yarns (number) | Single yarn fineness & | Strength/ elongation # | Hot water shrinkage percentage (%) | | | |
| Ex. 12 | 2.45 | 1.05 | 3.5 | 0.3 | 24 | 3.5 | 3.2/34 | 12 | — | 22 | AA |
| Ex. 13 | 1.75 | 1.75 | 3.5 | 0.5 | 24 | 3.5 | 3.3/30 | 10 | — | 22 | AA |
| Ex. 14 | 3.15 | 1.35 | 4.5 | 0.3 | 24 | 3.5 | 3.1/31 | 17 | — | 18 | AA |
| Ex. 15 | 2.25 | 2.25 | 4.5 | 0.5 | 24 | 3.5 | 3.0/31 | 14 | — | 18 | AA |

TABLE 3-continued

| | Multifilament | | | | | | | | Blended spun yarn Step condition | Dyeability: C method (L* value) 98° C. | Comprehensive evaluation |
|---|---|---|---|---|---|---|---|---|---|---|---|
| | Component A* | Component B* | A + B* | B/(A + B) | Number of single yarns (number) | Single yarn fineness & | Strength/ elongation # | Hot water shrinkage percentage (%) | | | |
| Ex. 16 | 2.25 | 2.25 | 4.5 | 0.5 | 36 | 2.3 | 2.9/30 | 13 | — | 18 | AA |
| Ex. 17 | 2.45 | 1.05 | 3.5 | 0.3 | 24 | 3.5 | 3.2/34 | 12 | AA | 22 | AA 1) |
| Ex. 18 | 1.75 | 1.75 | 3.5 | 0.5 | 24 | 3.5 | 3.3/30 | 10 | AA | 22 | AA 1) |
| Ex. 19 | 2.45 | 1.05 | 3.5 | 0.3 | 24 | 3.5 | 3.2/34 | 12 | AA | 22 | AA 1) |
| Comp. Ex. 15 | 4.05 | 0.45 | 4.5 | 0.1 | 24 | 3.5 | 2.0/35 | 20 | — | 18 | CC |
| Comp. Ex. 16 | 0.90 | 3.60 | 4.5 | 0.8 | 24 | 3.5 | 3.2/32 | 17 | — | 18 | CC |
| Comp. Ex. 17 | 1.25 | 1.25 | 2.5 | 0.5 | 24 | 3.5 | 3.5/31 | 16 | — | 26 | CC |
| Comp. Ex. 18 | 2.50 | 0.00 | 2.5 | 0.0 | 24 | 3.5 | 2.2/33 | 22 | — | 26 | CC |
| Comp. Ex. 19 | 2.50 | 0.00 | 2.5 | 0.0 | 12 | 7.0 | 2.3/33 | 24 | — | 26 | CC |
| Comp. Ex. 20 | 0 | 0 | 0 | 0 | 24 | 3.5 | 4.0/32 | 10 | — | 74 | CC |
| Comp. Ex. 21 | 4.05 | 0.45 | 4.5 | 0.1 | 24 | 3.5 | 2.0/35 | 20 | CC 3) | 22 | CC 2) |
| Comp. Ex. 22 | 0.90 | 3.60 | 4.5 | 0.8 | 24 | 3.5 | 3.2/32 | 17 | AA | 22 | CC |
| Comp. Ex. 23 | 4.05 | 0.45 | 4.5 | 0.1 | 24 | 3.5 | 2.0/35 | 20 | CC 3) | 22 | CC 2) |

*Unit is mol %.
&: The unit of the single yarn fineness is dtex.
: The unit of the strength is cN/dtex, and the unit of elongation is %.
1): The polyester multifilament of the invention after dyeing is uniformly situated at the sheath part of the combined filament yarn, and is dyed.
2): The core part and the sheath part after dyeing are in ununiform and marbled form.
3): A large number of fluffs.

Example 20

The copolymerized polyester chip obtained in Example 1 was dried at 140° C. for 5 hours. Then, by means of a spinneret having 72 orifice holes, a 90 dtex/72 filament partially drawn yarn was produced at a spinning temperature of 285° C. and at a winding rate of 3000 m/min. Further, by means of a false twisting device shown in FIG. 5, the resulting partially drawn yarn was subjected to false twist drawing processing to 1.6 times, resulting in a 56 dtex/72 filament false twisted textured yarn. The evaluation results of the resulting yarn are shown in Table 4.

Examples 21 to 23, Comparative Examples 24 to 27

The same experiment was carried out in the same manner as in Example 20, except that the amounts of sodium dimethyl 5-sulfoisophthalate and tetrabutyl phosphonium 5-sulfoisophthalate to be added in Example 20 were changed so as to be the values shown in Table 4. The evaluation results of the resulting yarn are shown in Table 4.

Example 24

The same experiment was carried out in the same manner as in Example 20, except that a spinneret having 144 orifice holes was used for spinning and discharging in Example 23. The evaluation results of the resulting yarn are shown in Table 4.

Example 25

The false twisted textured yarn obtained in Example 22, and as an elastomer yarn, a 44-dtex polyether ester type elastomer yarn were prepared. Using these yarns, and by means of a hollow spindle device, a covering yarn in which the false twisted textured yarn of Example 22 covers around the elastomer yarn was produced under such conditions that the number of covering twists is 500 T/m. The strength and elongation of the false twisted textured yarn were favorable, and hence the covering step condition was favorable. The evaluation of the normal pressure cationic dyeability with the tube woven fabric was also favorable.

Comparative Example 28

The same experiment was carried out in the same manner as in Comparative Example 27, except that a spinneret having 144 orifice holes was used for spinning and discharging in Comparative Example 27. The evaluation results of the resulting yarn are shown in Table 4.

Comparative Example 29

Evaluation was carried out in the same manner as in Example 20 using only a polyethylene terephthalate resin not containing the component A and the component B. The normal pressure cationic dyeability was inferior, and the appearance was bad. The evaluation results of the resulting yarn are shown in Table 4.

Comparative Example 30

A covering yarn was formed in the same manner as in Example 25 using the false twisted textured yarn of Comparative Example 24. The dyeability was favorable, but the strength and the elongation were not sufficient. Thus, in the covering step, a large number of yarn breakages and fluffs occurred, and the step condition was bad.

TABLE 4

| | Multifilament | | | | | | | False twisted textured yarn | | Dyeability | | |
|---|---|---|---|---|---|---|---|---|---|---|---|---|
| | Component A* | Component B* | A + B* | B/(A + B) | Number of single yarns (number) | Spinnability | Fineness & | Step condition | Fineness & | Strength/ elongation # | C method (L* value) 98° C. | Comprehensive evaluation |
| Ex. 20 | 2.45 | 1.05 | 3.5 | 0.3 | 72 | AA | 1.25 | AA | 0.78 | 3.6/33 | 22 | AA |
| Ex. 21 | 1.75 | 1.75 | 3.5 | 0.5 | 72 | AA | 1.25 | AA | 0.78 | 3.8/36 | 22 | AA |
| Ex. 22 | 3.15 | 1.35 | 4.5 | 0.3 | 72 | AA | 1.25 | AA | 0.78 | 3.6/35 | 18 | AA |
| Ex. 23 | 2.25 | 2.25 | 4.5 | 0.5 | 72 | AA | 1.25 | AA | 0.78 | 3.7/34 | 18 | AA |
| Ex. 24 | 2.25 | 2.25 | 4.5 | 0.5 | 144 | AA | 0.63 | AA | 0.39 | 3.3/35 | 18 | AA |
| Comp. Ex. 24 | 4.05 | 0.45 | 4.5 | 0.1 | 72 | BB | 1.25 | CC | 0.78 | 2.5/35 | 18 | CC |
| Comp. Ex. 25 | 0.90 | 3.60 | 4.5 | 0.8 | 72 | AA | 1.25 | AA | 0.78 | 4.0/35 | 18 | CC |
| Comp. Ex. 26 | 1.25 | 1.25 | 2.5 | 0.5 | 72 | AA | 1.25 | AA | 0.78 | 3.7/34 | 26 | CC |
| Comp. Ex. 27 | 2.50 | 0.00 | 2.5 | 0 | 72 | BB-CC | 1.25 | CC | 0.78 | 3.6/33 | 26 | CC |
| Comp. Ex. 28 | 2.50 | 0.00 | 2.5 | 0 | 144 | CC | 0.63 | CC | 0.39 | 1.8/29 | 26 | CC |
| Comp. Ex. 29 | 0 | 0 | 0 | 0 | 72 | AA | 1.25 | AA | 0.78 | 4.0/36 | 74 | CC |

*Unit is mol %.
&: The unit of the fineness is dtex.
: The unit of the strength is cN/dtex, and the unit of elongation is %.
C method: Evaluation by the C method of normal pressure cationic dyeability Production of Hollow Fiber and Modified Cross Section Fiber Example 26

The copolymerized polyester chip obtained in Example 1 was dried at 140° C. for 5 hours. Then, a polymer was extruded from a spinneret having a slit width of 0.08 mm, a pitch circle diameter (PCD) of 0.8 mm, and 24 orifice holes at a spinning temperature of 285° C. Thus, a 330 dtex/24 filament raw yarn was formed at a winding rate of 400 m/min. Then, the raw yarn was drawn to 4.0 times, resulting in an 83 dtex/24 filament hollow drawn yarn. The evaluation results of the resulting hollow drawn yarn are shown in Table 5.

Examples 27 to 29, Comparative Examples 31 to 34

The same experiment was carried out in the same manner as in Example 26, except that the amounts of sodium dimethyl 5-sulfoisophthalate and tetrabutyl phosphonium 5-sulfoisophthalate to be added in Example 26 were changed so as to be the values shown in Table 5. The evaluation results of the resulting hollow drawn yarn are shown in Table 5.

Example 30

The same experiment was carried out in the same manner as in Example 29, except for using a spinneret having a width of the slit of 0.08 mm, a pitch circle diameter (PCD) of 0.8 mm, and 36 orifice holes used for spinning and discharging in Example 29. The evaluation results of the resulting hollow drawn yarn are shown in Table 5.

Example 31

The hollow multifilament of Example 30, and as an elastomer yarn, a 44-dtex polyether ester type elastomer yarn were prepared. Using these yarns, and by means of a hollow spindle device, a covering yarn in which the hollow multifilament of Example 30 covers around the elastomer yarn was produced under such conditions that the number of covering twists was 500 T/m. The strength and elongation of the hollow multifilament were favorable, and hence the covering step condition was favorable. The evaluation of the normal pressure cationic dyeability with the tube woven fabric was also favorable. The evaluation results of the resulting yarn are shown in Table 5.

Comparative Example 35

The same experiment was carried out in the same manner as in Example 29, except that a spinneret having 12 orifice holes was used for spinning and discharging in Comparative Example 34. The evaluation results of the resulting yarn are shown in Table 5.

TABLE 5

| | Polyester hollow fiber | | | | | | | | Normal pressure cationic dyeability B method (L* value) | | Dyeability C method (L* value) |
|---|---|---|---|---|---|---|---|---|---|---|---|
| | Component A* [mol %] | Component B* [mol %] | A + B [mol %] | B/(A + B) | Number of single yarns (number) | Fineness & | Strength/ elongation # | Hollow ratio (%) | 80° C. | 100° C. | 98° C. |
| Ex. 26 | 2.45 | 1.05 | 3.5 | 0.3 | 24 | 3.5 | 2.6/35 | 32 | 54 | 30 | 22 |
| Ex. 27 | 1.75 | 1.75 | 3.5 | 0.5 | 24 | 3.5 | 2.8/33 | 37 | 54 | 31 | 22 |

TABLE 5-continued

| | Polyester hollow fiber | | | | | | | | Normal pressure cationic dyeability B method (L* value) | | Dyeability C method (L* value) |
|---|---|---|---|---|---|---|---|---|---|---|---|
| | Component A* [mol %] | Component B* [mol %] | A + B [mol %] | B/ (A + B) | Number of single yarns (number) | Fineness & | Strength/ elongation # | Hollow ratio (%) | 80° C. | 100° C. | 98° C. |
| Ex. 28 | 3.15 | 1.35 | 4.5 | 0.3 | 24 | 3.5 | 2.5/31 | 30 | 50 | 28 | 18 |
| Ex. 29 | 2.25 | 2.25 | 4.5 | 0.5 | 24 | 3.5 | 2.6/32 | 40 | 50 | 29 | 18 |
| Ex. 30 | 2.25 | 2.25 | 4.5 | 0.5 | 36 | 2.3 | 2.5/30 | 34 | 52 | 29 | 18 |
| Ex. 31 | 2.25 | 2.25 | 4.5 | 0.5 | 36 | 2.3 | <u>2.2/—</u>* | (34)* | <u>50</u>* | <u>28</u>* | 18 |
| Comp. Ex. 31 | 4.05 | 0.45 | 4.5 | 0.1 | 24 | 3.5 | 1.8/33 | 28 | 50 | 28 | 18 |
| Comp. Ex. 32 | 0.90 | 3.60 | 4.5 | 0.8 | 24 | 3.5 | 2.7/32 | 41 | 56 | 38 | 18 |
| Comp. Ex. 33 | 1.25 | 1.25 | 2.5 | 0.5 | 24 | 3.5 | 2.8/30 | 39 | 59 | 36 | 26 |
| Comp. Ex. 34 | 2.50 | 0.00 | 2.5 | 0.0 | 24 | 3.5 | 1.8/33 | 39 | 57 | 37 | 26 |
| Comp. Ex. 35 | 2.50 | 0.00 | 2.5 | 0.0 | 12 | 7.0 | 1.9/32 | 38 | 58 | 36 | 26 |

&: The unit of the fineness is dtex.
: The unit of the strength is cN/dtex, and the unit of elongation is %.
*The underlined part shows the result of the covering yarn, and the hollow ratio shows the value of the hollow cross section polyester yarn.
B method: Evaluation by the B method of normal pressure cationic dyeability
C method: Evaluation by the C method of normal pressure cationic dyeability Example 32

The copolymerized polyester chip obtained in Example 1 was spun from a spinneret having 36 discharge holes resulting in the single yarn cross sectional shape shown in FIG. 2A at a spinning temperature of 290° C. A lubricant was applied thereto, and the fabric was taken up at a spinning rate of 3000 m/min. Thereafter, the fabric was not once wound, but was drawn under the conditions of a preheat temperature of 85° C., a heat setting temperature of 120° C., and a draw ratio of 1.67, and was wound at a rate of 5000 m/min. This resulted in a multifilament including a flat cross section fiber with a single yarn fineness of 2.4 dtex, and a total fineness of 86 dtex. The modification degree of the multifilament was found to be 4.0. The resulting multifilament was woven at a weaving density of 110 filaments/2.54 cm, with warp and weft untwisted, resulting in a plain woven fabric. Then, according to an ordinary method, dyeing processing was carried out. Evaluation was carried out for the resulting fabric with each method described above. The evaluation results of the multifilament and the fabric are shown in Table 6.

Examples 33 to 35, Comparative Examples 36 to 39

The experiment was carried out in the same manner as in Example 32, except that the amounts of sodium dimethyl 5-sulfoisophthalate and tetrabutyl phosphonium 5-sulfoisophthalate to be added in Example 32 were changed so as to be the values shown in Table 6. Subsequently, as with Example 32, the A/B value in Table 6 is in agreement with the modification degree. The evaluation results of the multifilament and the fabric are shown in Table 6.

Examples 36 and 37

The experiment was carried out in the same manner as in Example 32, except for using a spinneret having 36 orifice holes resulting in each single yarn cross sectional shape shown in FIG. 2B or 2C. The evaluation results of the multifilament and the fabric are shown in Table 6.

TABLE 6

| | Flat cross sectional shape (FIGS. 2 No.) | A + B* | B/ (A + B) | DEG [wt %] | ηC [dL/g] | Fineness & | Strength # | A/B $ | B/C $ | Yarn making property | Dyeability C method (L* value) | Fabric softness |
|---|---|---|---|---|---|---|---|---|---|---|---|---|
| Ex. 32 | A | 3.5 | 0.3 | 1.9 | 0.64 | 2.4 | 3.7 | 4.0 | 2.2 | AA | 24 | AA |
| Ex. 33 | A | 3.5 | 0.5 | 2.0 | 0.66 | 2.4 | 3.8 | 3.8 | 3.5 | AA | 24 | AA |
| Ex. 34 | A | 4.5 | 0.3 | 2.2 | 0.65 | 2.4 | 3.5 | 3.2 | 3.5 | AA | 20 | AA |
| Ex. 35 | A | 4.5 | 0.5 | 1.9 | 0.67 | 2.4 | 3.6 | 5.1 | 4.5 | AA | 20 | AA |
| Ex. 36 | B | 3.5 | 0.3 | 1.9 | 0.64 | 2.4 | 3.7 | 4.0 | 2.2 | AA | 24 | AA |
| Ex. 37 | C | 3.5 | 0.3 | 1.9 | 0.64 | 2.4 | 3.7 | 4.0 | 2.2 | AA | 24 | AA |
| Comp. Ex. 36 | A | 3.5 | 0.8 | 1.9 | 0.53 | 2.4 | 2.8 | 4.0 | 1.8 | CC | 24 | AA |
| Comp. Ex. 37 | A | 4.5 | 0.1 | 2.1 | 0.41 | 2.4 | 2.2 | 3.8 | 1.2 | CC | 20 | AA |
| Comp. Ex. 38 | A | 5.5 | 0.3 | 2.3 | 0.43 | 2.4 | 1.8 | 3.2 | 2.5 | CC | 18 | AA |

TABLE 6-continued

|  | Flat cross sectional shape (FIGS. 2 No.) | A + B* | B/(A + B) | DEG [wt %] | ηC [dL/g] | Fineness & | Strength # | A/B $ | B/C $ | Yarn making property | Dyeability C method (L* value) | Fabric softness |
|---|---|---|---|---|---|---|---|---|---|---|---|---|
| Comp. Ex. 39 | A | 2.5 | 0.3 | 1.5 | 0.65 | 2.4 | 3.9 | 2.8 | 2.8 | AA | 28 | AA |

*The unit is mol %.
&: The unit of the fineness is dtex.
: The unit of the tensile strength is cN/dtex.
$: denotes the length of A, B, and C in FIG. 3.
C method: Evaluation by the C method of normal pressure cationic dyeability.

Production of Composite False Twisted Textured Yarn

Example 38

Using dried polyethylene terephthalate, a polyester filament yarn (96 dtex/24 filaments) with an elongation of 70% resulting from melt spinning at a rate of 4500 m/min was produced. Whereas, the normal pressure cationic dyeable copolymerized polyester chip obtained in Example 1 was molten at 285° C., and was wound at a spinning rate of 2500 m/min by a known melt spinning method, resulting in a polyester filament yarn (180 dtex/48 filaments) with an elongation of 150%. The resulting polyester filament yarn was produced.

Figure 6:
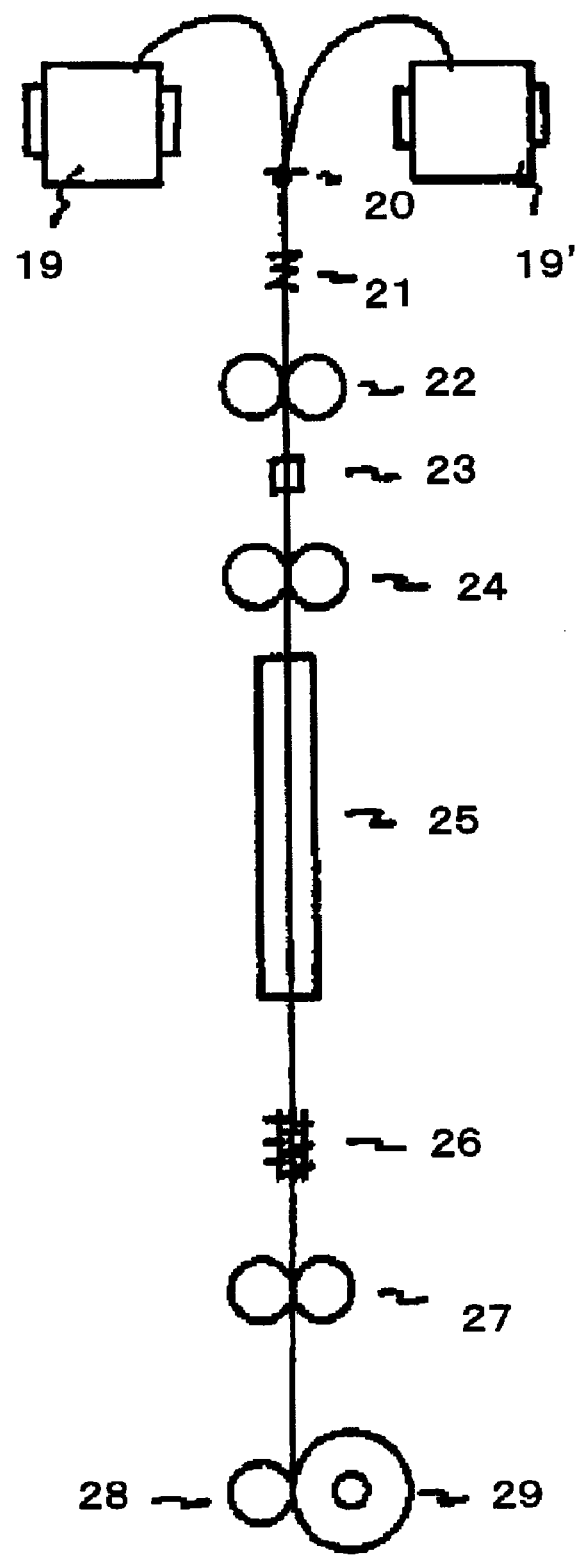
FIG. 6 A schematic view showing one embodiment of an apparatus for carrying out composite false twisting of the invention used in Example.

These two kinds of polyester filament yarns were doubled, and were subjected to an intermingling treatment and a draw false twisting in the step of FIG. 6.

Namely, the two yarns were fed to a feed roller 6, and were subjected to an interlace treatment by means of an interlace nozzle 7 at an overfeed ratio of 0.5% under a compressed air pressure of 4 kg/cm² between it and a first delivery roller 8, thereby to impart 40 intermingling points per meter. Subsequently, the yarns were fed to a false twisting zone via the roller 8. Thus, draw false twisting was carried out at a draw ratio of 1.284 times, a number of false twists of 2400 T/M, a heater temperature of 210° C., and a yarn speed, i.e., a speed of the second delivery roller 11 of 250 m/min.

When the finished yarn thus obtained was observed under a microscope, it was found to be a false twisted textured yarn having a symmetric alternately twisted double layer structure, and to be a finished yarn having partial intermingling (23 points/M) including filaments mutually entangled between the yarn (elongation 30%) forming the core part and the yarn (elongation 55%) forming the outer layer part. Further, the yarn was used, and woven. As a result, there was no trouble such as the occurrence of neps in the weaving step. The resulting woven fabric also had a spun-like texture. Further, favorable result was also obtained in dyeability. The results are shown in Table 7.

Examples 39 to 41, Comparative Examples 40 to 43

The experiment was carried out in the same manner as in Example 38, except that the amounts of sodium dimethyl 5-sulfoisophthalate and tetrabutyl phosphonium 5-sulfoisophthalate to be added in Example 38 were changed so as to be the values shown in Table 7. The results are shown in Table 7.

TABLE 7

|  | Component A [mol %] | Component B [mol %] | A + B [mol %] | B/(A + B) | DEG [wt %] | ηC [dL/g] | Tensile strength [cN/dtex] | Step passability | Dyeability C method (L* value) |
|---|---|---|---|---|---|---|---|---|---|
| Ex. 38 | 2.45 | 1.05 | 3.5 | 0.3 | 1.9 | 0.64 | 3.2 | AA | 22 |
| Ex. 39 | 1.75 | 1.75 | 3.5 | 0.5 | 2.0 | 0.66 | 3.3 | AA | 22 |
| Ex. 40 | 3.15 | 1.35 | 4.5 | 0.3 | 2.2 | 0.65 | 3.1 | BB | 18 |
| Ex. 41 | 2.25 | 2.25 | 4.5 | 0.5 | 1.9 | 0.67 | 3.2 | AA | 18 |
| Comp. Ex. 40 | 3.85 | 1.65 | 5.5 | 0.3 | 2.3 | 0.43 | 1.8 | CC | 16 |
| Comp. Ex. 41 | 2.75 | 2.75 | 5.5 | 0.5 | 2.2 | 0.45 | 1.9 | CC | 16 |
| Comp. Ex. 42 | 1.75 | 0.75 | 2.5 | 0.3 | 1.5 | 0.65 | 3.4 | AA | 26 |
| Comp. Ex. 43 | 1.25 | 1.25 | 2.5 | 0.5 | 1.4 | 0.65 | 3.5 | AA | 26 |

The term "step passability" is evaluated according to the same method and criteria as with the step condition.
C method: Evaluation by the C method of normal pressure cationic dyeability.

INDUSTRIAL APPLICABILITY

In accordance with the present invention, it is possible to provide a polyester fiber which is favorable in dyeability by a cationic dye under normal pressure, and has a higher strength than that of a conventional normal pressure cationic dyeable polyester fiber. Further, it is possible to provide a combined filament yarn and a covering yarn using a polyester fiber produced from the normal pressure cationic dyeable polyester. The combined filament yarn and the covering yarn can be blended with other fibers resistant to other high temperature dyeing, and has a property of high strength low hot water shrinkage. Therefore, they are suitable for gentlemen's and women's clothing use requiring the balance among sharp tone, texture, strength, and elongation. Further, the normal pressure cationic dyeable polyester multifilament of the invention, or the false twisted textured yarn and the covering yarn using the same are high in strength, and favorable in normal pressure cationic dyeability and fastness, and hence can be used in the form of a fine size yarn. Therefore, it is possible to obtain a fabric having texture, softness, and denseness. When, as a polyester fiber, a hollow fiber or a modified cross section fiber is produced, it is high in strength, and favorable in normal pressure cationic dyeability and fastness, and has excellent performances in terms of the heat retaining property, bulkiness, light weight, and the like. Therefore, it is preferably used for fiber for clothing, and is also preferably used for material applications such as fiber for interior/bedding typified by curtain, carpet, wadding, or the like, various woven fabrics, various knitted fabrics, staple nonwoven fabrics, and filament nonwoven fabrics. Finally, the spun-like composite false twisted textured yarn using the normal pressure cationic dyeable polyester fiber of the invention is favorable in bulkiness, and can be interknitted or interwoven with a natural fiber or an urethane fiber to be dyed. Thus, it is possible to provide a soft and sharp polyester fabric for gentlemen's clothing or polyester fabric for women's clothing. The industrial significance thereof is very large.

The invention claimed is:

1. A copolymerized polyester having a main repeating unit comprising ethylene terephthalate, the copolymerized polyester comprising, in an acid component forming the copolymerized polyester, a metal salt of sulfoisophthalic acid (A) and a compound (B) expressed as the following formula (I) in such a state as to simultaneously satisfy the following mathematical expressions (1) and (2),

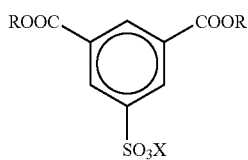

(I)

wherein in the formula, R represents a hydrogen atom, or an alkyl group having 1 to 10 carbon atoms, X represents a quaternary phosphonium ion or a quaternary ammonium ion;

$$3.0 \leq A+B \leq 5.0 \quad (1)$$

$$0.3 \leq B/(A+B) \leq 0.7 \quad (2)$$

where in the mathematical expressions, A represents the copolymerization amount (mol %) of the metal salt of sulfoisophthalic acid (A) based on the total amount of acid components forming the copolymerized polyester, and B represents the copolymerization amount (mol %) of the compound (B) expressed as the formula (I) based on the total amount of acid components forming the copolymerized polyester.

2. The copolymerized polyester according to claim 1, wherein the glass transition temperature is within the range of 70 to 85° C., and the intrinsic viscosity of the resulting copolymerized polyester is within the range of 0.55 to 1.00 dL/g.

3. A polyester fiber obtained by melt spinning, and drawing the copolymerized polyester according to claim 1.

4. A modified cross section polyester fiber obtained by melt spinning the copolymerized polyester according to claim 1, wherein the modification degree of the fiber cross section in the direction orthogonal to the fiber axis of the fiber is 1.2 to 7.0.

5. A hollow polyester fiber obtained by melt spinning the copolymerized polyester according to claim 1, wherein the hollow ratio of the fiber is 2 to 70%.

6. A false twisted textured yarn obtained by false twisting the fiber obtained by melt spinning the copolymerized polyester according to claim 1.

7. A composite yarn comprising the polyester fiber according to claim 3.

8. A composite yarn comprising the false twisted textured yarn according to claim 6.

9. A covering yarn obtained by covering an elastic fiber with a polyester fiber, wherein the polyester fiber is the polyester fiber according to claim 3.

10. A covering yarn obtained by covering an elastic fiber with a false twisted textured yarn, wherein the false twisted textured yarn is the false twisted textured yarn according to claim 6.

* * * * *